United States Patent

Toda

(10) Patent No.: US 6,377,522 B1
(45) Date of Patent: Apr. 23, 2002

(54) OPTICAL DISC APPARATUS AND KAND/GROOVE DETECTING CIRCUIT

(75) Inventor: Yasushi Toda, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/465,764

(22) Filed: Dec. 17, 1999

(30) Foreign Application Priority Data

Dec. 18, 1998 (JP) .......................................... 10-360342

(51) Int. Cl.⁷ ............................................. G11B 7/00
(52) U.S. Cl. ........................ 369/44.26; 369/44.28; 369/53.23
(58) Field of Search .......................... 369/44.26, 44.27, 369/44.28, 44.29, 53.2, 53.22, 53.23

(56) References Cited

U.S. PATENT DOCUMENTS

| | | | |
|---|---|---|---|
| 5,311,490 A | * 5/1994 | Matoba et al. ........... | 369/44.26 |
| 5,504,725 A | * 4/1996 | Katsumata ............... | 369/44.28 |
| 5,568,461 A | * 10/1996 | Nishiuchi et al. ........ | 369/44.26 |
| 5,696,742 A | * 12/1997 | Ogata et al. ............. | 369/53.35 |
| 5,859,820 A | * 1/1999 | Nasasawa et al. ....... | 369/44.26 |
| 5,896,365 A | * 4/1999 | Hiroki ..................... | 369/44.28 |
| 6,233,207 B1 | * 5/2001 | Tanaka ................... | 369/44.26 |

FOREIGN PATENT DOCUMENTS

| | | |
|---|---|---|
| JP | 63-4271 | 1/1988 |
| JP | 1-54794 | 11/1989 |
| JP | 5-109093 | 4/1993 |
| JP | 9-161274 | 6/1997 |
| JP | 9-282667 | 10/1997 |
| JP | 9-305985 | 11/1997 |

* cited by examiner

Primary Examiner—Thang V. Tran
(74) Attorney, Agent, or Firm—McGinn & Gibb, PLLC

(57) ABSTRACT

A defined level comparator compares a track error signal with each of a predetermined upper limit level and a predetermined lower limit level so as to generate two comparison signals. A logic unit ANDs two comparison signals so as to obtain a track pull-in enabling signal. A header component removal arithmetic unit removes a header component from the track pull-in enabling signal in accordance with a header area signal. A track polarity inverter outputs a land/groove detection signal in which a polarity of a signal level is inverted every timing at which a signal level of the track pull-in enabling signal is in a track pull-in enabling state. A track polarity correcting and determining unit compares a polarity signal held by a sampling holder with the land/groove detection signal in the header area. The track polarity correcting and determining unit corrects the signal level of the land/groove detection signal to the signal level held by the sampling holder when both signal levels are different from each other.

19 Claims, 17 Drawing Sheets

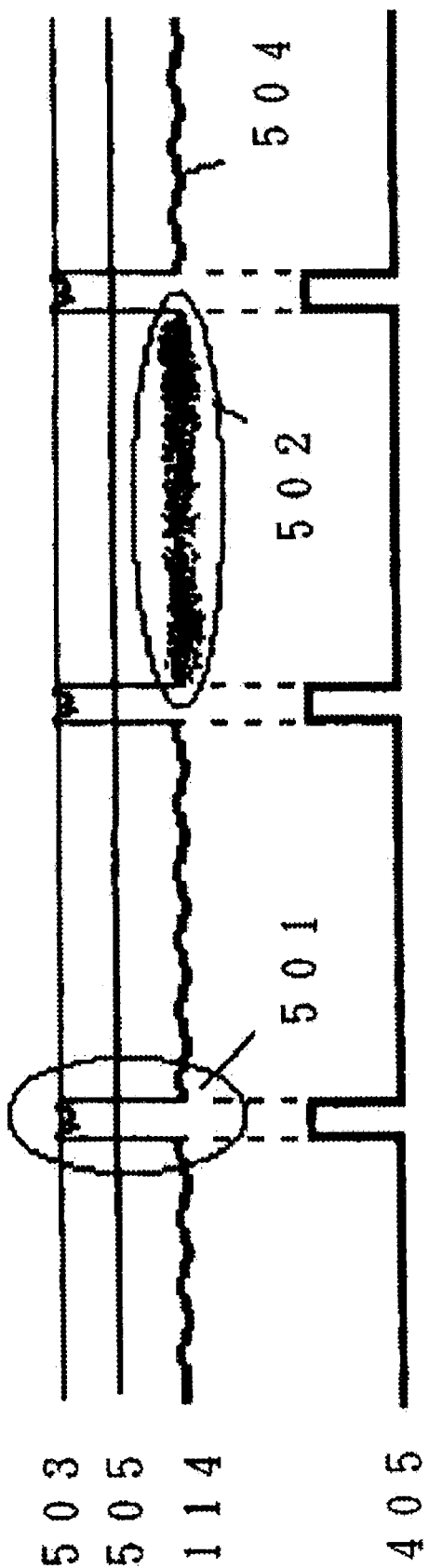

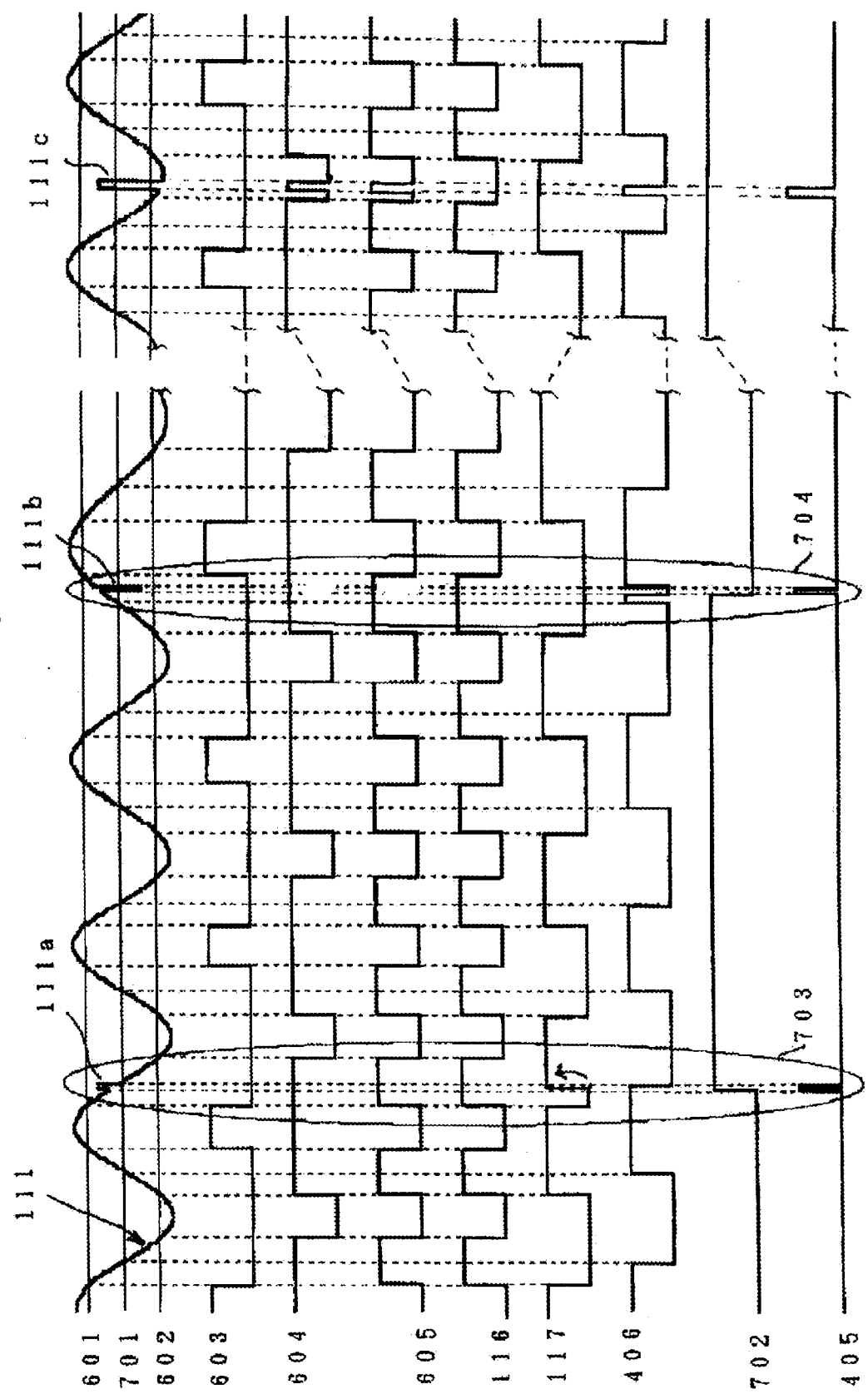

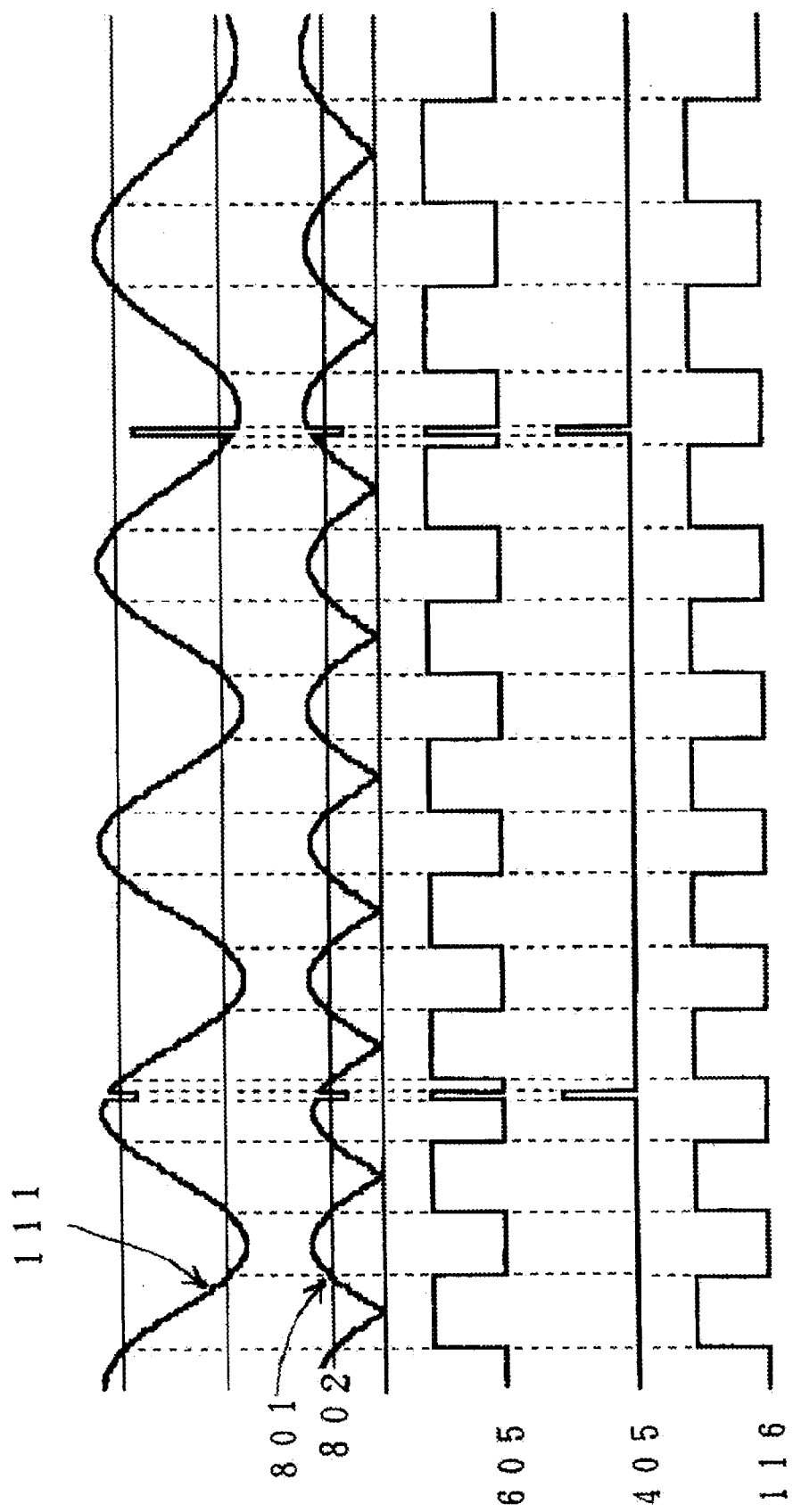

OPTICAL DISC APPARATUS AND KAND/GROOVE DETECTING CIRCUIT

BACKGROUND OF THE INVENTION

1. Field of the Invention

The present invention relates to an optical disc apparatus capable of recording information onto lands and grooves, which are formed on an optical disc, respectively, or capable of reproducing recorded information, respectively, and relates to a land/groove detecting circuit. Particularly, the present invention relates to an optical disc apparatus, which appropriately detects the lands and grooves, making it possible to stably perform track pull-in operations with respect to the lands and grooves, respectively, and relates to a land/groove detecting circuit.

2. Description of the Related Art

In generally, the optical disc comprises groove portions, which are referred to as grooves, and land portions, which are referred to as lands, such that they are helically or concentrically provided in a row arrangement alternately. The conventional optical disc apparatus records or reproduces information using either the lands or the grooves.

In recent years, to improve recording density of the optical disc, there has been known an optical disc apparatus, which employs a land/groove recording and reproducing system in which information can be recorded in the lands and the grooves and reproduced. FIG. 16 is a block diagram showing one example of the conventional optical disc apparatus using the land/groove recording and reproducing system.

As shown in FIG. 16, the optical disc apparatus comprises an optical head 101, a thread motor 121, a focus control system 300, and a track control system 310.

The optical head 101 comprises a laser 102, an objective lens 120, a beam splitter 103, an optical sensor 104, a focus actuator 105, and a track actuator 106, and records information onto the lands and grooves of the optical disc 100, which is driven at a given number of revolutions by a spindle motor (not shown), and reproduces information stored therein, respectively.

The laser 102 generates optical beams (laser beams), and irradiates the optical disc 100 through the objective lens 120. The objective lens 120 converges the optical beams onto a track surface of the optical disc 100 (where the lands and grooves are formed) to be irradiated therewith. Also, the object lens 120 sends the reflected light of optical beams to the optical sensor 104, and forms an image on the optical sensor 104 through the beam splitter 103. The beam splitter 103 changes an optical path of the reflected light from the optical disc 100, and supplies the reflected light to the optical sensor 104. The optical sensor 104 has four light-receiving sections, generates a servo signal in accordance with the amount of light received by the respective light-receiving sections, and supplies the generated servo signal to the focus control system 300 and the track control system 310.

The focus actuator 105, which is controlled by the focus control system 300, moves the objective lens 120 along an optical axis (focus direction). The track actuator 106, which is controlled by the track control system 310, moves the objective lens 120 in the direction of the radius of the optical disc 100 (tracking direction). In other words, the track actuator 106 controls the objective lens 120 such that the optical beams with which the optical disc 100 is irradiated are rendered to follow the target lands or grooves.

The thread motor 121 moves the entirety of the optical head 101 in the radial direction of the optical disc 100.

The focus control system 300 comprises a focus error signal generating circuit 107, a phase compensation filter 109, a switch circuit 125, a driver amplifier 122, and a CPU 124, and controls the focus actuator 105.

The focus error signal generating circuit 107 generates a focus error signal 108, which shows the shift of the optical beams, with which the optical disc 100 has been irradiated, from the focal point of the disc surface, in accordance with the servo signal. The phase compensation filter 109 supplies the focus error signal 108 to the driver amplifier 122 through the switch circuit 125 as compensating for its phase. The switch circuit 125, which is controlled by CPU 124, turns on or off the entire operation of the focus control system 300. The driver amplifier 122 drives the focus actuator 105 such that the value of the supplied focus error signal 108 becomes "0".

The track control system 310 comprises a track error signal generating circuit 110, a phase compensation filter 112, a switch circuit 126, a driver amplifier 123, and a CPU 124, and controls the track actuator 106.

The track error generating circuit 110 generates a track error signal 111, which shows the shift of the optical beams, with which the optical disc 100 has been irradiated, from the track (the center of the lands or grooves), in accordance with the servo signal. The phase compensation filter 112 supplies the track error signal 111 to the driver amplifier 123 through the switch circuit 126 as compensating for its phase. The switch circuit 126, which is controlled by CPU 124, turns on or off the entire operation of the track control system 310. The driver amplifier 123 drives the focus actuator 106 such that the value of the supplied track error signal 111 becomes "0".

The CPU 124 performs on/off control of the entire operation of each of the focus control system 300 and the track control system 310 by controlling the switching circuits 125 and 126.

The following will specifically explain the track error signal 111, which is generated when the optical beams irradiated from the optical head 101 move on the optical disc 100, with reference to FIG. 17.

If the optical beams irradiated from the optical head 101 move on the rotating optical disc 100 in the radial direction, the actual track is shown by an arrow LB of FIG. 17A. In other words, the optical beams pass through the lands and grooves as crossing them sequentially along the arrow LB and they pass through the headers on the way. Since the reflection state of optical beams changes at the time of these passages, the amount of received light of each light receiving sections of the optical sensor 104, which receives the reflected light, also changes. The signal level of the track error signal 111 generated by the track error signal generating circuit 107 changes with the above change.

More specifically, as shown FIG. 17B, if the optical beams move on the optical disc 100, the signal level of the track error signal 111 becomes "0" when the optical beams are present at the centers P1, P3, P5 of the lands and grooves. Then, if the optical beams deviate from these centers, the signal level changes to a positive side or a negative side.

For this reason, the track control system 310 provides feedback control to the track actuator 106 such that the signal level of the track error signal 111 becomes "0", rendering the optical beams irradiated from the optical head 101 to follow the centers of the target lands or those of the grooves.

The polarity of the track error signal 111 differs between a case in which the optical beams move from the land to the groove and a case in which the optical beams move from the groove to the land. For this reason, in a track pull-in operation in which the optical beams are rendered to follow the target track (lands or grooves), in some cases, the optical disc apparatus has difficulty in performing the track pull-in operation stably. In other words, if the track actuator 106 is controlled with the polarity opposite to the actual case, the track control system 310 is subjected to a positive feedback (the signal level is not changed to "0").

Therefore, when the track control system 310 controls the track actuator 106, the polarity of the track error signal 111 must be inverted in a case in which the optical beams are rendered to follow the lands and a case in which the optical beams are rendered to follow the grooves.

Unexamined Japanese Patent Application KOKAI Publication No. H5-109093 discloses the technique in which the polarities of the lands and grooves are detected when the track pull-in operation is performed. While, Examined Japanese Patent Application KOKOKU Publication Nos. S63-4271 and H1-54794 disclose the technique in which the track pull-in operation can be stably performed even when the track actuator is controlled with the opposite polarity.

The optical disc apparatus disclosed in Unexamined Japanese Patent Application KOKAI Publication No. H5-109093 binarizes a track sum signal, which shows the total amount of received light, in accordance with the difference in the reflection coefficient of the optical beams between the lands and the grooves, thereby determining the polarity of the land or that of the groove. The optical disc apparatus performs the track pull-in operation when the determined polarity of the land or that of the groove matches a reference polarity. As a result, the track pull-in operation can be stably performed.

While, the optical disc apparatus disclosed in Examined Japanese Patent Application KOKOKU Publication Nos. S63-4271 and H1-54794 make use of the point that an envelope component of a RF signal of such as FM signal band, etc., which is recorded in the optical disc is out of shift with the track error signal 90 degrees. The optical disc apparatus binarizes the envelope component of RF signal and the track error signal individually. The optical disc apparatus samples the envelope component of the binarized RF signal at the time of detecting an edge of the binarized track error signal. The optical disc apparatus generates a track error signal as holding the sampled value until a next edge of the track error signal is detected. At the time of performing the track control in accordance with the generated track gate signal, the optical disc apparatus makes the track control valid only when the polarity of the specified land or the groove matches the polarity of the track gate signal. As a result, the track pull-in operation can be stably performed.

However, the techniques disclosed in these publications are directed to the case in which information is recorded onto either the lands or the grooves. This makes it difficult to detect the polarities of the lands and grooves appropriately even if these techniques are directly applied to the optical disc apparatus of the land/groove recording and reproducing system. Namely, the reflection coefficient of the land and that of the groove are preferably equal to each other in the actual optical disc of the land/groove recording and reproducing system. This results in that the detection method using the difference in the reflection coefficient on the disc as disclosed in Unexamined Japanese Patent Application KOKAI Publication No. H5-109093 can not be used. Also, the envelope of the RF signal cannot be obtained in an unrecorded state of information at the time of an initial use of the optical disc. This results in that the method using the envelope of the RF signal disclosed in Examined Japanese Patent Application KOKOKU Publication Nos. S63-4271 and H1-54794 can not be used.

In a case where the optical disc apparatus of the land/groove recording and reproducing system can not detect the polarities of the land and groove, the track pull-in operation becomes unstable. Namely, if the polarities of the land and groove can not be detected correctly, the probability that the polarity of the target land or the groove will match the polarity of the land or the groove, which the optical beams are presently following, reduces to ½ at the time of the track pull-in operation. Then, in a case where the track pull-in operation is performed with the polarity opposite to the original polarity, the track control system is subjected to the positive feedback, and the track actuator, etc., may run way.

In order to solve the above problems, Unexamined Japanese Patent Application KOKAI Publication No. H9-305985 discloses the technique of determining the lands and grooves. This technique makes use of inverting the relationship in the phase between a vibration waveform obtained when the track actuator is vibrated at a predetermined frequency and the signal waveform of the track error signal in the lands and grooves. The optical disc apparatus disclosed in Unexamined Japanese Patent Application KOKAI Publication No. H9-305985 vibrates the track actuator in the radial direction of the optical disc at a relatively high frequency within the range of less than ¼ of the distance between adjacent lands. The optical disc apparatus determines the lands and grooves from the relationship in the phase between the vibration waveform and the signal waveform occurring at the track error signal, and performs the track pull-in operation. As a result, the lands and the grooves can be determined.

However, in the technique disclosed in Unexamined Japanese Patent Application KOKAI Publication No. H9-305985, there is a possibility that the detection of the lands and grooves will become difficult in the actual optical disc. The optical disc apparatus disclosed in Unexamined Japanese Patent Application KOKAI Publication No. H9-305985 vibrates the track actuator in the radial direction of the optical disc so as to obtain the signal for a polarity determination. In this case, since eccentricity, that is, the shift between the center of the disc and that of the rotation exists in the actual optical disc, there is a case in which an error signal, which is caused with the periodic relative displacement, is not output to the track actuator in accordance with the rotation of the optical disc. As a result, it is impossible to clearly differentiate between the error signal and the signal for a polarity determination. For this reason, the detection of the lands and grooves cannot be accurately performed only by the technique disclosed in Unexamined Japanese Patent Application KOKAI Publication No. H9-305985. Moreover, since the track pull-in operation is performed in a state in which the track actuator vibrates, an amount of control increases to some extent. This causes possibility that the optical beams will rush into the track with the opposite polarity over the target track (lands and grooves). Then, if the track pull-in operation is performed with the opposite polarity, the probability that a failure will occur in the pull-in operation increases, and it becomes necessary to perform the track pull-in operation again, with the result that much time is required for the sequence of the track pull-in.

SUMMARY OF THE INVENTION

An object of the present invention is to provide an optical disc apparatus capable of appropriately determining polarities of lands and grooves and capable of performing a track pull-in operation stably, and to provide a land/groove detecting circuit. Also, another object of the present invention is to provide an optical disc apparatus, which can shorten track pull-in time and seek operation time by stabilizing a track pull-in operation, and to provide a land/groove detecting circuit.

In order to the above objects, according to the first aspect of the present invention, there is provided an optical disc apparatus comprising optical beam irradiating means for irradiating a track, which has lands and grooves formed on an optical disc, with optical beams; light-receiving means for receiving reflected light of the optical beams irradiated by the optical beam irradiating means; track error signal generating means for generating a track error signal, which shows a shift from the track in the optical beam irradiated by the optical beam irradiating means, in accordance with an amount of the reflected light received by the light receiving means; track sum signal generating means for generating a track sum signal, which shows a total amount of the reflected light, in accordance with the amount of the reflected light received by the light receiving means; land/groove detecting means for generating a track pull-in enabling signal, which shows track pull-in enabling timing, and a land/groove detection signal for determining a land or a groove in accordance with the track error signal generated by the track error signal generating means and the track sum signal generated by the track sum signal generating means; and track pull-in means for performing track pull-in in accordance with the track pull-in enabling signal generated by the land/groove detecting means and the land/groove detection signal.

According to this invention, the track error signal generating means generates the track error signal, which shows the shift from the track in the optical beams irradiated by the optical beam irradiating means, in accordance with the amount of reflected light received by the light receiving means. The track sum signal generating means generates the track sum signal, which shows the total amount of reflected light, in accordance with the amount of reflected light received by the light receiving means. The land/groove detecting means generates the land/groove detection signal for determining the track pull-in enabling signal, which shows the track pull-in enabling timing, and the land or the groove detection signal in accordance with the track error signal generated by the track error signal generating means and the track sum signal generated by the track sum signal generating means. As a result, the polarity of the land and that of the groove can be appropriately determined, so that the track pull-in operation can be stably operated. Also, it is possible to shorten track pull-in time and seek operation time by stabilizing the track pull-in operation.

The land/groove detecting means may comprise header area signal generating means for generating a header area signal, which shows a header area in the optical disc, in accordance with the track sum signal generated by the track sum signal generating means; track pull-in enabling signal generating means for generating the track pull-in enabling signal in accordance with the track error signal generated by the track error signal generating means and the header area signal generated by the header area signal generating means; track cross signal generating means for generating a track cross signal, which shows that the optical beams irradiated by the optical beam irradiating means have crossed the center of the track; and land/groove detection signal generating means for generating a land/groove detection signal in accordance with the track pull-in enabling signal generated by the track pull-in enabling signal generating means, the header area signal generated by the header area signal generating means, and the track cross signal generated by the track cross signal generating means. In this case, not only the track pull-in enabling timing but also the polarity of the land and that of the groove can be appropriately determined.

The header area signal generating means may comprise a peak detector for detecting a peak value from the track sum signal generated by the track sum signal generating means; a low-pass filter for extracting a low frequency component from the track sum signal generated by the track sum signal generating means; a header detection level generator for generating a header detection level in accordance with the peak value detected by the peak detector and the low frequency component extracted by the low-pass filter; and a header area detector for comparing the track sum signal generated by the track sum signal generating means with the header detection level generated by the header detection level generator so as to generate the header area signal.

The track pull-in enabling signal generating means may comprise a level comparator for comparing the track error signal generated by the track error signal generating means with each of a predetermined upper limit level and a predetermined lower limit level so as to generate two comparison signals showing the comparison results; a logic unit for ANDing two comparison signals generated by the level comparator; and a header component removal arithmetic unit for outputting the track pull-in enabling signal from which the header component is removed from the result of the logic unit in accordance with the header area signal generated by the header area signal generating means.

The track pull-in enabling signal detecting means may comprise an absolute value signal generator for generating an absolute value signal in which a negative level is inverted from the track error signal generated by the track error signal generating means; a defined level comparator for comparing the absolute value signal generated by the absolute value signal generator with a predetermined defined level so as to generate a comparison signal showing the comparison result; and a header component removal arithmetic unit for outputting the track pull-in enabling signal from which the header component is removed from the comparison signal generated by the defined level comparator in accordance with the header area signal generated by the header area signal generating means.

The track pull-in enabling signal detecting means may comprise a low-pass filter for extracting a low frequency component from the track error signal generated by the track error signal generating means; a level comparator for comparing the low frequency component extracted by the low-pass filter with each of a predetermined upper limit level and a predetermined lower limit level so as to generate two comparison signals showing the comparison results; and a logic unit for ANDing two comparison signals generated by the level comparator.

The track pull-in enabling signal detecting means may comprise a low-pass filter for extracting a low frequency component from the track error signal generated by the track error signal generating means; an absolute value signal generator for generating an absolute value signal in which a negative level is inverted from the low frequency component extracted by the low-pass filter; and a defined level comparator for comparing the absolute value signal generated by the absolute value signal generator with a predetermined defined level so as to generate a comparison signal showing the comparison result.

The land/groove detection signal generating means may comprise a track polarity inverter for generating a land/groove detection signal in which a signal level in the land and groove is inverted in accordance with the track pull-in enabling signal generated by the track pull-in enabling signal generating means; a sample holder for holding a signal level of the track cross signal generated by the track cross signal generating means in accordance with the header area signal generated by the header area signal generating means; and a track polarity corrector for inverting the signal level of the land/groove detection signal generated by the track polarity inverter when the land/groove detection signal generated by the track polarity inverter is compared with the track cross signal held by the sample holder and no match exists in both signals.

The land/groove detection signal generating means may further comprise means for inputting a land/groove selection signal, which selects either one of the land and the groove, and for outputting a signal enabling a target track pull-in to be performed in accordance with the input land/groove selection signal.

In order to achieve the above objects, according to the second aspect of the present invention, there is provided an optical disc apparatus comprising a laser irradiator for irradiating a track, which has a land and a groove formed on an optical disc, with optical beams; an optical sensor for receiving reflected light of the optical beams irradiated by the laser irradiator; a track error signal generating circuit for generating a track error signal, which shows a shift from the track in the optical beam irradiated by the laser irradiator, in accordance with an amount of the reflected light received by the optical sensor; a track sum signal generating circuit for generating a track sum signal, which shows a total amount of the reflected light, in accordance with the amount of the reflected light received by the optical sensor; a land/groove detecting circuit for generating a track pull-in enabling signal, which shows track pull-in enabling timing, and a land/groove detection signal for determining a land or a groove in accordance with the track error signal generated by the track error signal generating circuit and the track sum signal generated by the track sum signal generating circuit; and a track actuator for performing track pull-in in accordance with the track pull-in enabling signal generated by the land/groove detecting circuit and the land/groove detection signal.

According to this invention, the track error signal generating circuit generates the track error signal, which shows the shift from the track in the optical beams irradiated by the laser irradiator, in accordance with the amount of reflected light received by the optical sensor. The track sum signal generating circuit generates the track sum signal, which shows the total amount of reflected light, in accordance with the amount of reflected light received by the optical sensor. The land/groove detecting circuit generates the land/groove detection signal for determining the track pull-in enabling signal, which shows the track pull-in enabling timing, and the land or the groove detection signal in accordance with the track error signal generated by the track error signal generating circuit and the track sum signal generated by the track sum signal generating circuit. As a result, the polarity of the land and that of the groove can be appropriately determined, so that the track pull-in operation can be stably operated. Also, it is possible to shorten track pull-in time and seek operation time by stabilizing the track pull-in operation.

In order to achieve the above objects, according to the third aspect of the present invention, there is provided a land/groove detecting circuit comprising header area signal generating means for generating a header area signal, which shows a header area in an optical disc, in accordance with a track sum signal, which shows the total amount of reflected light of optical beams with which a track, which has lands and grooves formed on the optical disc, is irradiated; track pull-in enabling signal generating means for generating a track pull-in enabling signal, which shows track pull-in enabling timing, in accordance with a track error signal, which shows a shift from the track in the optical beams with which the optical disc is irradiated, a header area signal generated by the header area signal generating means; track cross signal generating means for generating a track cross signal, which shows that the optical beams with which the optical disc is irradiated have crossed the center of the track; and land/groove detection signal generating means for generating a land/groove detection signal for determining a land or a groove in accordance with the track pull-in enabling signal generated by the track pull-in enabling signal generating means, the header area signal generated by the header area signal generating means, and the track cross signal generated by the track cross signal generating means.

According to this invention, the header area signal generating means generates the header area signal, which shows the header area in the optical disk, in accordance with the track sum signal, which shows the total amount of reflected light of the optical beams with which the track, which has the land and the ground formed on the optical disc, is irradiated. The track pull-in enabling signal generating means generates the track pull-in enabling signal, which shows the track pull-in enabling timing, in accordance with the track error signal, which shows the shift from the track in the optical beams with which the optical disc is irradiated, the header area signal generated by the header area signal generating means. The track cross signal generating means generates the track cross signal, which shows that the optical beams with which the optical disc is irradiated have crossed the center of the track. The land/groove detection signal generating means generates the land/groove detection signal for determining a land or a groove in accordance with the track pull-in enabling signal generated by the track pull-in enabling signal generating means, the header area signal generated by the header area signal generating means, and the track cross signal generated by the track cross signal generating means. As a result, not only the track pull-in enabling timing but also the polarity of the land and that of the groove can be appropriately determined.

The header area signal generating means may comprise a peak detector for detecting a peak value from the track sum signal, which shows the total amount of reflected light of the optical beams with which the optical disk is irradiated; a low-pass filter for extracting a low frequency component from the track sum signal, which shows the total amount of reflected light of the optical beams with which the optical disk is irradiated; a header detection level generator for generating a header detection level in accordance with the peak value detected by the peak detector and the low frequency component extracted by the low-pass filter; and a header area detector for comparing the track sum signal, which shows the total amount of reflected light of the optical beams with which the optical disk is irradiated, with the header detection level generated by the header detection level generator so as to generate the header area signal.

The track pull-in enabling signal generating means may comprise a level comparator for comparing the track error signal, which shows a shift from the track in the optical beams with which the optical disc is irradiated, with each of a predetermined upper limit level and a predetermined lower limit level so as to generate two comparison signals showing the comparison results; a logic unit for ANDing two comparison signals generated by the level comparator; and a header component removal arithmetic unit for outputting the track pull-in enabling signal from which the header component is removed from the result of the logic unit in accordance with the header area signal generated by the header area signal generating means.

The track pull-in enabling signal detecting means may comprise: an absolute value signal generator for generating an absolute value signal in which a negative level is inverted from the track error signal generated by the track error signal, which shows a shift from the track in the optical beams with which the optical disc is irradiated; a defined level comparator for comparing the absolute value signal generated by the absolute value signal generator with a predetermined defined level so as to generate a comparison signal showing the comparison result; and a header component removal arithmetic unit for outputting the track pull-in enabling signal from which the header component is removed from the comparison signal generated by the defined level comparator in accordance with the header area signal generated by the header area signal generating means.

The track pull-in enabling detecting means may comprise: a low-pass filter for extracting a low frequency component from the track error signal, which shows a shift from the track in the optical beams with which the optical disc is irradiated; a level comparator for comparing the low frequency component extracted by the low-pass filter with each of predetermined upper limit level and lower limit level so as to generate two comparison signals showing the comparison result; and a logic unit for ANDing two comparison signals generated by the level comparator.

The track pull-in enabling signal detecting means may comprise: a low-pass filter for extracting a low frequency component from the track error signal, which shows a shift from the track in the optical beams with which the optical disc is irradiated; an absolute value signal generator for generating an absolute value signal in which a negative level is inverted from the low frequency component extracted by the low-pass filter; and a defined level comparator for comparing the absolute value signal generated by the absolute value signal generator with a predetermined defined level so as to generate a comparison signal showing the comparison result.

The land/groove detection signal generating means may comprise a track polarity inverter for generating a land/groove detection signal in which a signal level in the land and groove is inverted in accordance with the track pull-in enabling signal generated by the track pull-in enabling signal generating means; a sample holder for holding a signal level of the track cross signal generated by the rack cross signal generating means in accordance with the header area signal generated by the header area signal generating means; and a track polarity corrector for inverting the signal level of the land/groove detection signal generated by the track polarity inverter when the land/groove detection signal generated by the track polarity inverter is compared with the track cross signal held by the sample holder and no match exists in both signals.

The land/groove detecting circuit may further comprises means for inputting a land/groove selection signal, which selects either one of the land and the groove, and for outputting a signal enabling a target track pull-in to be performed in accordance with the input land/groove selection signal.

In order to achieve the above objects, according to the fourth aspect of the present invention, there is provided a land/groove detecting circuit comprising a header area signal generating circuit for generating a header area signal, which shows a header area in an optical disc, in accordance with a track sum signal, which shows a total amount of reflected light of optical beams with which a track, which has lands and grooves formed on the optical disc, is irradiated; a track pull-in enabling signal generating circuit for generating a track pull-in enabling signal, which shows track pull-in enabling timing, in accordance with a track error signal, which shows a shift from the track in the optical beams with which the optical disc is irradiated, a header area signal generated by the header area signal generating circuit; a track cross signal generating circuit for generating a track cross signal, which shows that the optical beams with which the optical disc is irradiated have crossed the center of the track; and a land/groove detection signal generating circuit for generating a land/groove detection signal for determining a land or a groove in accordance with the track pull-in enabling signal generated by the track pull-in enabling signal generating circuit, the header area signal generated by the header area signal generating circuit, and the track cross signal generated by the track cross signal generating circuit.

According to this invention, the header area signal generating circuit generates the header area signal, which shows the header area in the optical disk, in accordance with the track sum signal, which shows the total amount of reflected light of the optical beams with which the track, which has the land and the ground formed on the optical disc, is irradiated. The track pull-in enabling signal generating circuit generates the track pull-in enabling signal, which shows the track pull-in enabling timing, in accordance with the track error signal, which shows the shift from the track in the optical beams with which the optical disc is irradiated, the header area signal generated by the header area signal generating circuit. The track cross signal generating circuit generates the track cross signal, which shows that the optical beams with which the optical disc is irradiated have crossed the center of the track. The land/groove detection signal generating circuit generates the land/groove detection signal for determining a land or a groove in accordance with the track pull-in enabling signal generated by the track pull-in enabling signal generating circuit, the header area signal generated by the header area signal generating circuit, and the track cross signal generated by the track cross signal generating circuit. As a result, not only the track pull-in enabling timing but also the polarity of the land and that of the groove can be appropriately determined.

BRIEF DESCRIPTION OF THE DRAWINGS

These objects and other objects and advantages of the present invention will become more apparent upon reading of the following detailed description and the accompanying drawings in which:

FIG. 6 is a schematic view showing one example of a signal waveform to explain an operation of header area detecting circuit in the optical disc apparatus of the present invention;

FIG. 8 is an example of a signal waveform to explain an operation of a land/groove detecting section in the optical disc apparatus of the present invention;

FIG. 11 is a signal waveform view to example the configuration of the track pull-in enabling detecting circuit according to the second embodiment of the present invention;

DETAILED DESCRIPTION OF THE PREFERRED EMBODIMENTS

Figure 1:
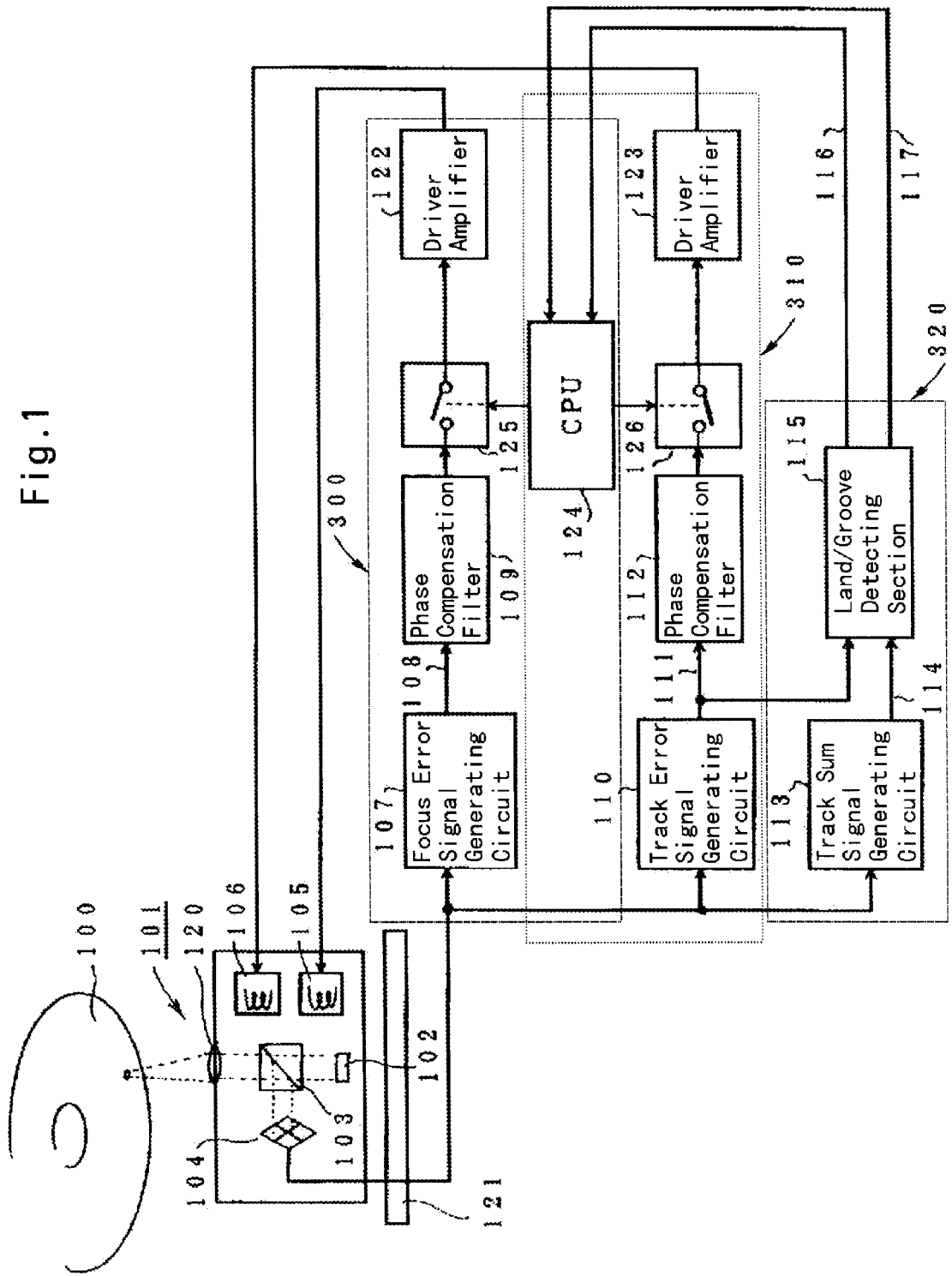
FIG. 1 is a block diagram showing one example of an optical disc apparatus according to a first embodiment of the present invention.

Embodiments of the present invention will now be specifically described with reference to the accompanying drawings herewith. FIG. 1 is a block diagram showing one example of an optical disc apparatus according to a first embodiment of the present invention.

As shown in FIG. 1, an optical disc apparatus comprises an optical head 101, a thread motor 121, a focus control system 300, a track control system 310, and a land/groove detection system 320.

The optical head 101 comprises a laser 102, an objective lens 120, a beam splitter 103, an optical sensor 104, a focus actuator 105, and a track actuator 106, and records information onto the lands and grooves of an optical disc 100, which is driven at a given number of revolutions by a spindle motor (not shown), and reproduces information stored therein, respectively. The optical disc 100 is formed such that the lands and the grooves are helically or concentrically provided in a row arrangement alternately.

The laser 102 generates optical beams (laser beams) with a predetermined wavelength, and irradiates the optical disc 100 with the generated optical beams through the object lens 120, etc.

The object lens 120 converges the optical beams generated by the laser 102 onto a track surface of the optical disc 100 (where the lands and grooves are formed) to be irradiated therewith. Also, the object lens 120 sends the optical beams reflected upon the track surface to the optical sensor 104, and forms an image on the optical sensor 104 through the beam splitter 103.

The beam splitter 103 changes an optical path of the reflected light from the optical disc 100, and supplies the reflected light to the optical sensor 104.

The optical sensor 104 has four light-receiving sections, and receives the reflected light supplied through the beam splitter 103 at the respective light-receiving sensors. The optical sensor 104 generates light-reception signals in accordance with the amount of light received by the respective light-receiving sections, and supplies the generated light-reception signals to the focus control system 300, track control system 310, and land/groove detection system 320.

The focus actuator 105, which is controlled by the focus control system 300, moves the objective lens 120 along an optical axis (focus direction).

The track actuator 106, which is controlled by the track control system 310, moves the objective lens 120 in the radial direction of the optical disc 100 (tracking direction). In other words, the track actuator 106 controls the objective lens 120 such that the optical beams with which the optical disc 100 is irradiated to be rendered to follow the target lands or grooves.

The thread motor 121 moves the optical head 101 in the radial direction of the optical disc 100. Namely, the thread motor 121 largely moves the entirety of the optical head 101 in the radial direction of the optical disc 100 at a seek time, etc.

The focus control system 300 comprises a focus error signal generating circuit 107, a phase compensation filter 109, a switch circuit 125, a driver amplifier 122, and a CPU 124, and controls the focus actuator 105.

The focus error signal generating circuit 107 generates a focus error signal 108, which shows the shift of the optical beams, with which the optical disc 100 has been irradiated, from the focal point of the disc surface, in accordance with the light-reception signals supplied from the optical sensor 104. The focus error signal generating circuit 107 supplies the generated focus error signal 108 to the phase compensation filter 109.

The phase compensation filter 109 supplies the focus error signal 108 sent from the focus error signal generating circuit 107 to the driver amplifier 122 through the switch circuit 125 as compensating for its phase.

The switch circuit 125, which is controlled by CPU 124, turns on or off the entire operation of the focus control system 300.

The driver amplifier 122 controls the focus actuator 105 in accordance with the focus error signal 108 supplied through the switch circuit 125. In other words, the driver amplifier 122 drives the focus actuator 105 such that the value of the supplied focus error signal 108 becomes "0".

The track control system 310 comprises a track error signal generating circuit 110, a phase compensation filter 112, a switch circuit 126, a driver amplifier 123, and a CPU 124, and controls the track actuator 106.

The track error generating circuit 110 generates a track error signal 111, which shows the shift of the optical beams, with which the optical disc 100 has been irradiated, from the track (the center of the land or groove), in accordance with the light-reception signals supplied from the optical sensor 104. The track error generating circuit 110 supplies the generated track error signal 111 to the phase compensation filter 112 and a land/groove detecting section 115.

The phase compensation filter 112 supplies the track error signal 111 sent from the track error signal generating circuit 110 to the driver amplifier 123 through the switch circuit 126 as compensating for its phase.

The switch circuit 126, which is controlled by CPU 124, turns on or off the entire operation of the track control system 310.

The driver amplifier 123 controls the track actuator 106 in accordance with the track error signal 111 supplied through the switch circuit 126. In other words, the driver amplifier 123 drives the track actuator 106 such that the value of the supplied track error signal 111 becomes "0".

CPU 124 controls the switch circuits 125 and 126, thereby turning on/off the operation of each of the focus control system 300 and the track control system 310. In addition, CPU 124 controls the switch circuit 126 in accordance with a track pull-in enabling signal 116 (to be described later) sent from the land/groove detection system 320 and a land/groove detection signal 117.

The land/groove detection system 320 comprises a track sum signal generating circuit 113 and a land/groove detecting section 115.

The track sum signal generating circuit 113 generates a track sum signal 114, which shows the total amount of received light, in accordance with four light-reception signals supplied from the optical sensor 104. The track sum signal generating circuit 113 supplies the generated track sum signal 114 to the land/groove detecting section 115.

The land/groove detecting section 115 generates the track pull-in enabling signal 116, which shows timing at which the track pull-in can be performed, and a land/groove detection signal 117 for determining the lands or the grooves, in accordance with the track error signal 111 sent from the track error signal generating circuit 110 and the track sum signal 114 sent from the track sum generating circuit 113, and supplies them to CPU 124.

Figure 2:
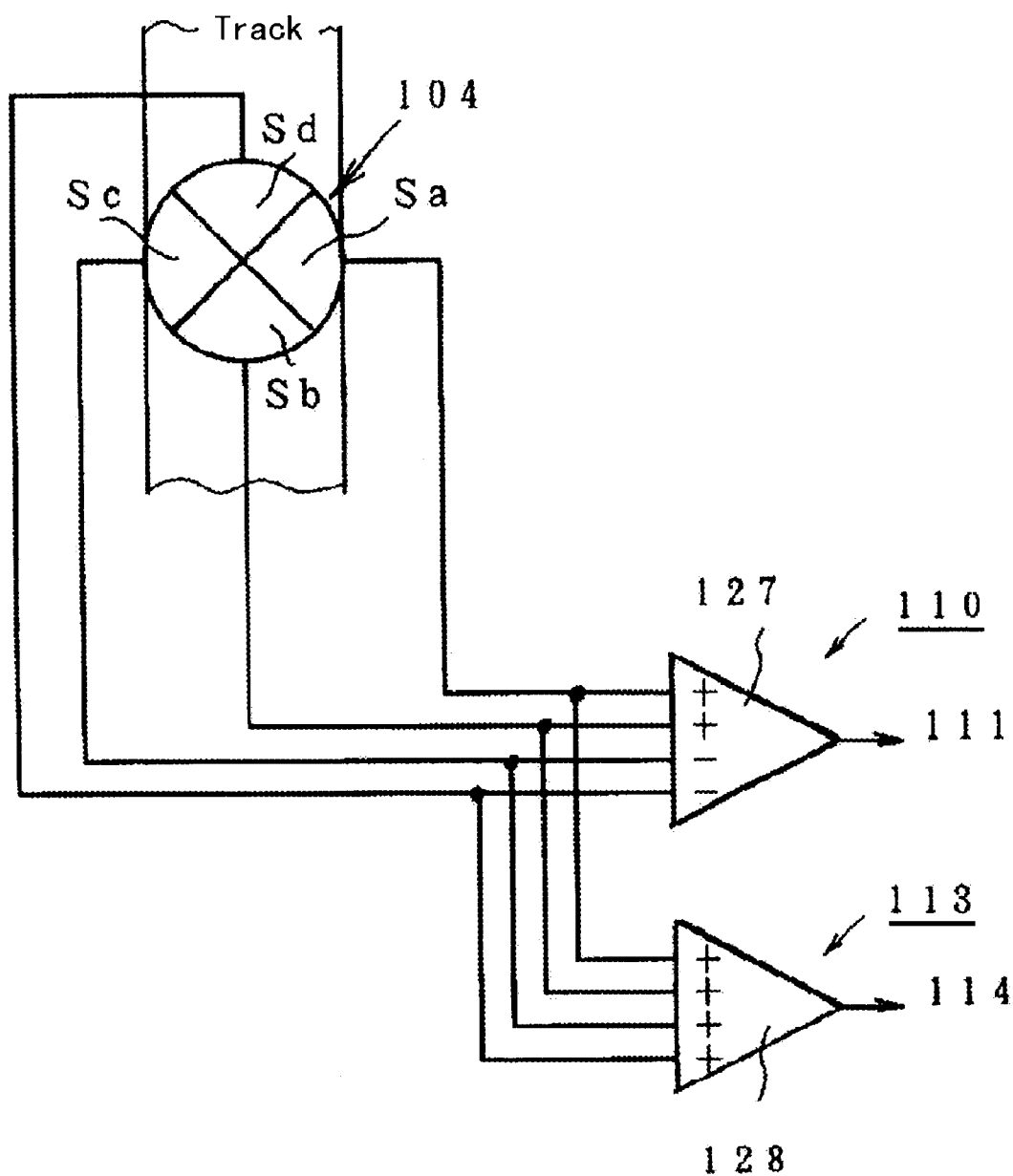
FIG. 2 is a schematic view to explain a track error signal generated in accordance with a light-reception signal sent from an optical sensor and a track sum signal.

The following will specifically explain the configuration of the above-mentioned track error signal generating circuit 110 and that of the track sum signal generating circuit with reference to FIG. 2.

As shown in FIG. 2, the track error signal generating circuit 110 comprises, for example, an arithmetic unit 127, and generates the track error signal 111 in accordance with the light-received signals sent from four light-receiving sections Sa to Sd of the optical sensor 104. In other words, the arithmetic unit 127 obtains a level difference between the light-received signals output from the light-receiving sections Sa and Sc, and obtains a level difference between the light-received signals output from the light-receiving sections Sb and Sd. The arithmetic unit 127 adds up the obtained levels, thereby generating the track error signal 111. Also, the track sum signal generating circuit 113 comprises, for example, an arithmetic unit 128, and adds up all light-received signals sent from the light-receiving sections Sa to Sd, thereby generating the track sum signal 114.

Figure 17A:
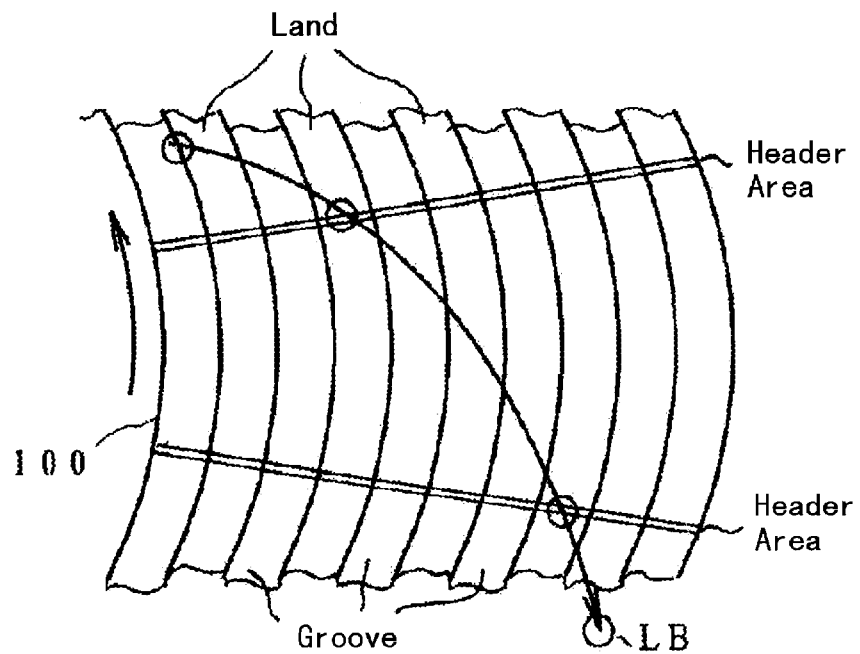
FIG. 17A is a schematic view to explain the track of optical beams moving on the optical disc.
Figure 17B:
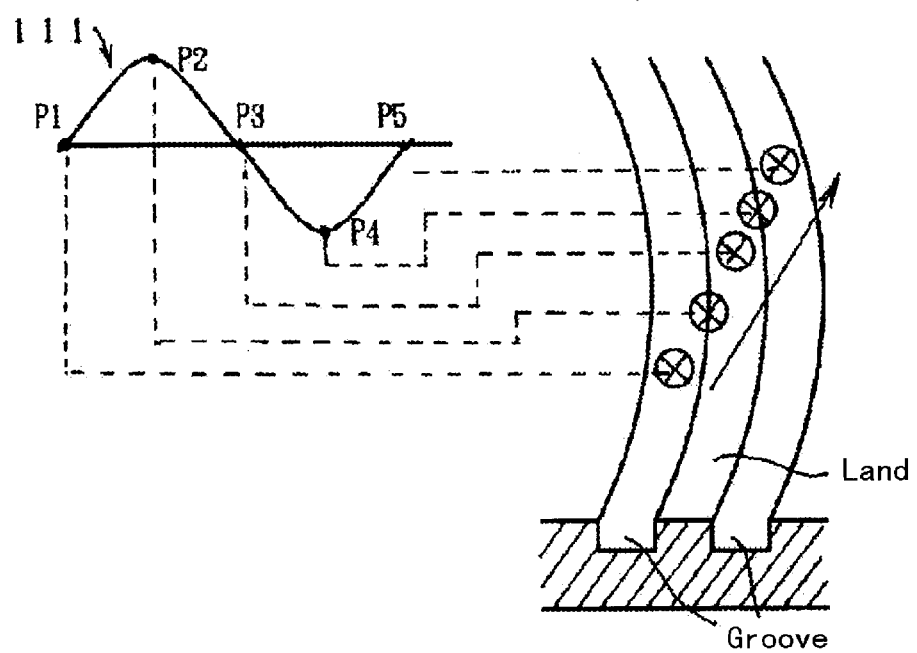
FIG. 17B is a schematic view showing a signal level of a track error signal when the optical beams move on the optical disk.

The track error signal 111 generated by the arithmetic unit 127 shows a variation in the signal level as shown in FIG. 17B when the optical beams, which is emitted from the optical head 101, move on the optical disk 100 in the radial direction.

The configuration of the optical sensor for generating the track error signal 111 and that of the arithmetic unit 127 are not limited to those shown in FIG. 2. For example, side detectors are further arranged at both sides of four-divided sensors constituting the optical sensor, and the light-received signals are supplied to the arithmetic unit 127 in accordance with light beams (side beams) received by the side detectors, whereby the track error signal 111 may be generated.

Figure 3A:
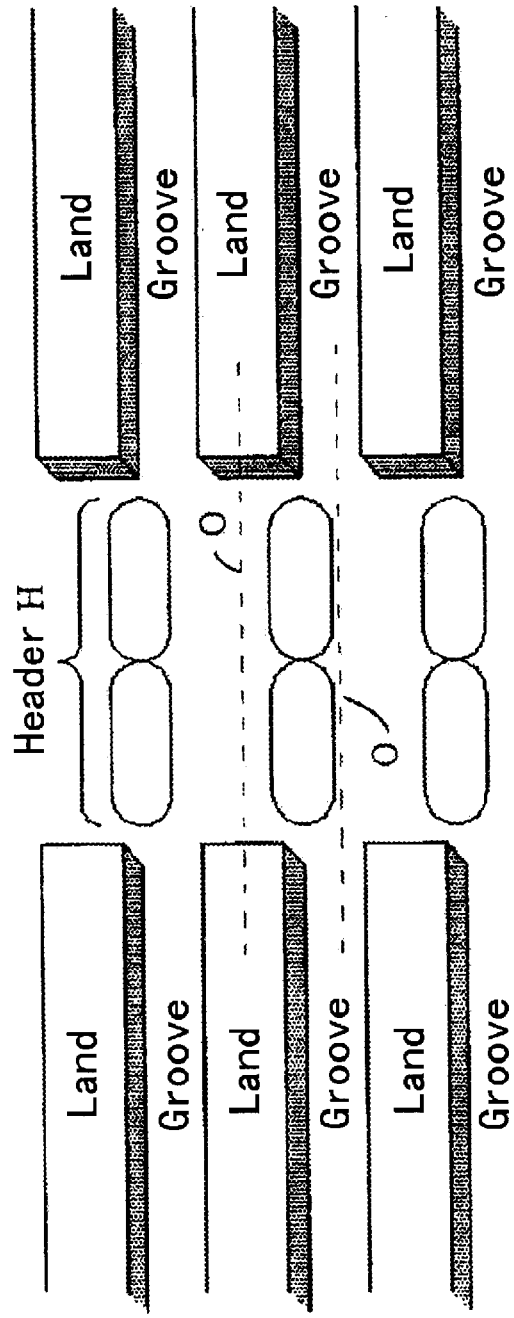
FIG. 3A is a schematic view showing the configuration of a header area of an optical disc used in the present invention.
Figure 3B:
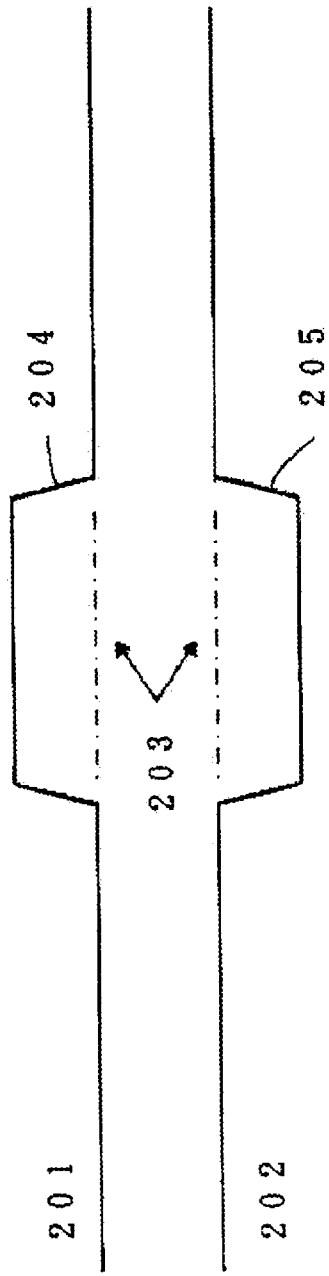
FIG. 3B is a schematic view showing a signal level of the track error signal in the header area.
Figure 4A:
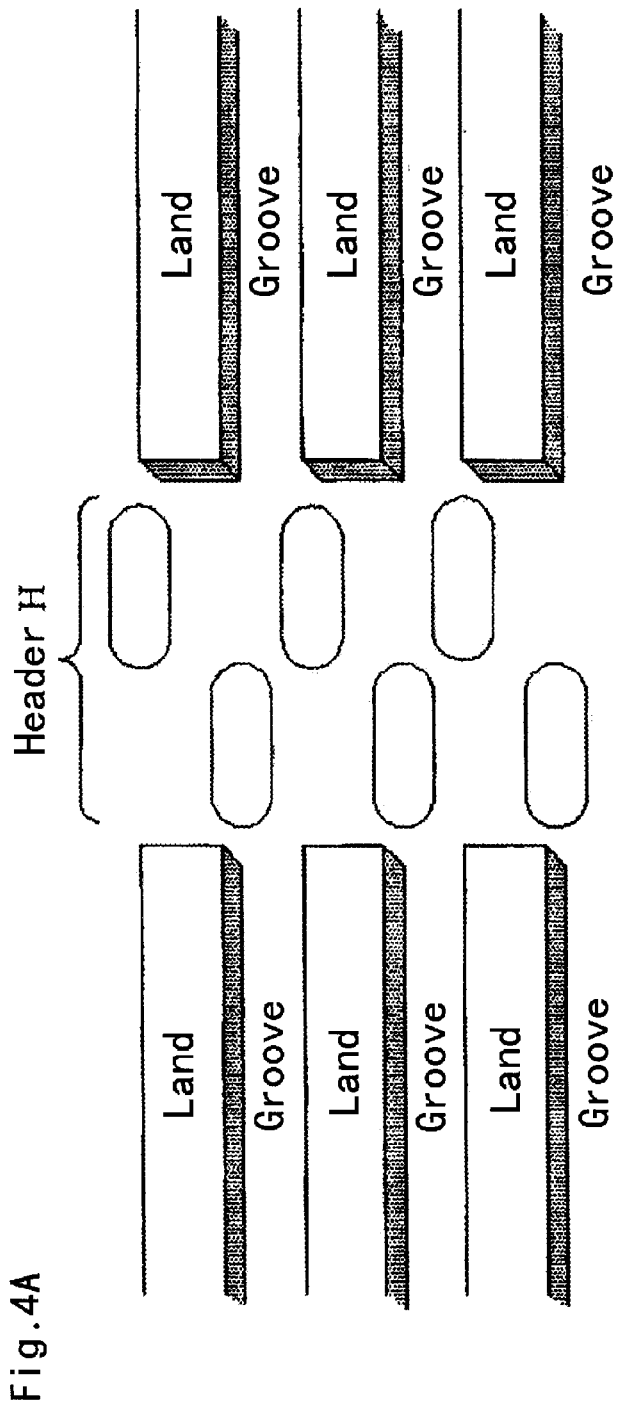
FIG. 4A is a schematic view showing the configuration of the other header area of an optical disc used in the present invention.
Figure 4B:
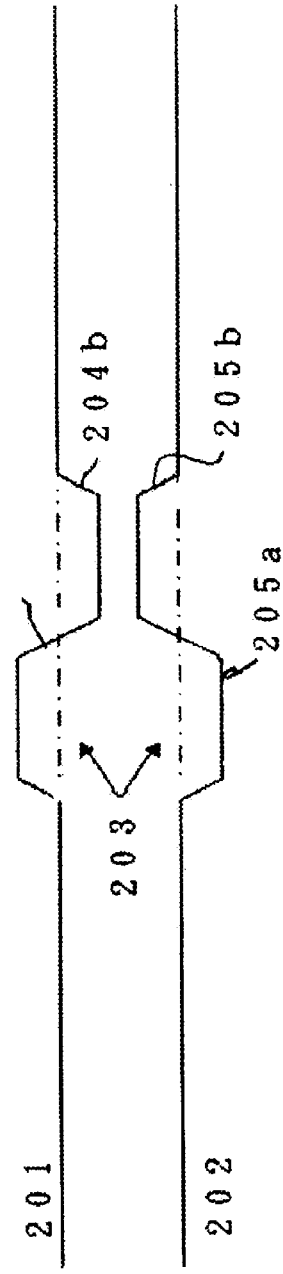
FIG. 4B is a schematic view showing a signal level of the track error signal in the header area.

The following will specifically explain the relationship between a header area of the optical disc 100 and the track error signal 111 with reference to FIGS. 3 and 4.

As shown in FIG. 3A, the optical disc 100 has a header area where headers H are arranged. In the header area, headers H in which address information is described are arranged at the position shifted from the center O of each of the lands and grooves, that is a boundary position between each land and each groove. A reflection coefficient of the header area is set to be higher than that of the data area (where the lands and grooves are arranged). Also, a mirror portion with a high reflection coefficient may be provided in the header area. As a result, the amount of light, which the optical sensor 104 receives, changes in the header area and the data area.

For example, if the optical beams move to the header area from the land, the track error signal 111 to be generated becomes a signal level as shown by a waveform 201 in FIG. 3B. In other words, the signal level of the track error signal 111 is a central level 203 in the data area, and varies by an amount of an offset 204 in a positive direction in the header area. While, if the optical beams move to the header area from the groove, the track error signal 111 to be generated becomes a signal level as shown by a waveform 202 in FIG. 3B. In other words, the signal level of the track error signal 111 is a central level 203 in the data area, and varies by an amount of an offset 205 in a negative direction in the header area. As a result, when the optical beams move to the header area from the data area, the land and groove can be determined in accordance with the offsets 204 and 205 each having a different polarity to be generated.

The headers H in the header area may be arbitrarily arranged without limiting the arrangement to one shown in FIG. 3A. For example, the headers H may be shifted alternately as shown in FIG. 4A. In this case, when the optical beams move to the header area from the data area, offsets 204a, 204b, 205a, 205b each having a different polarity can be obtained.

Figure 5:
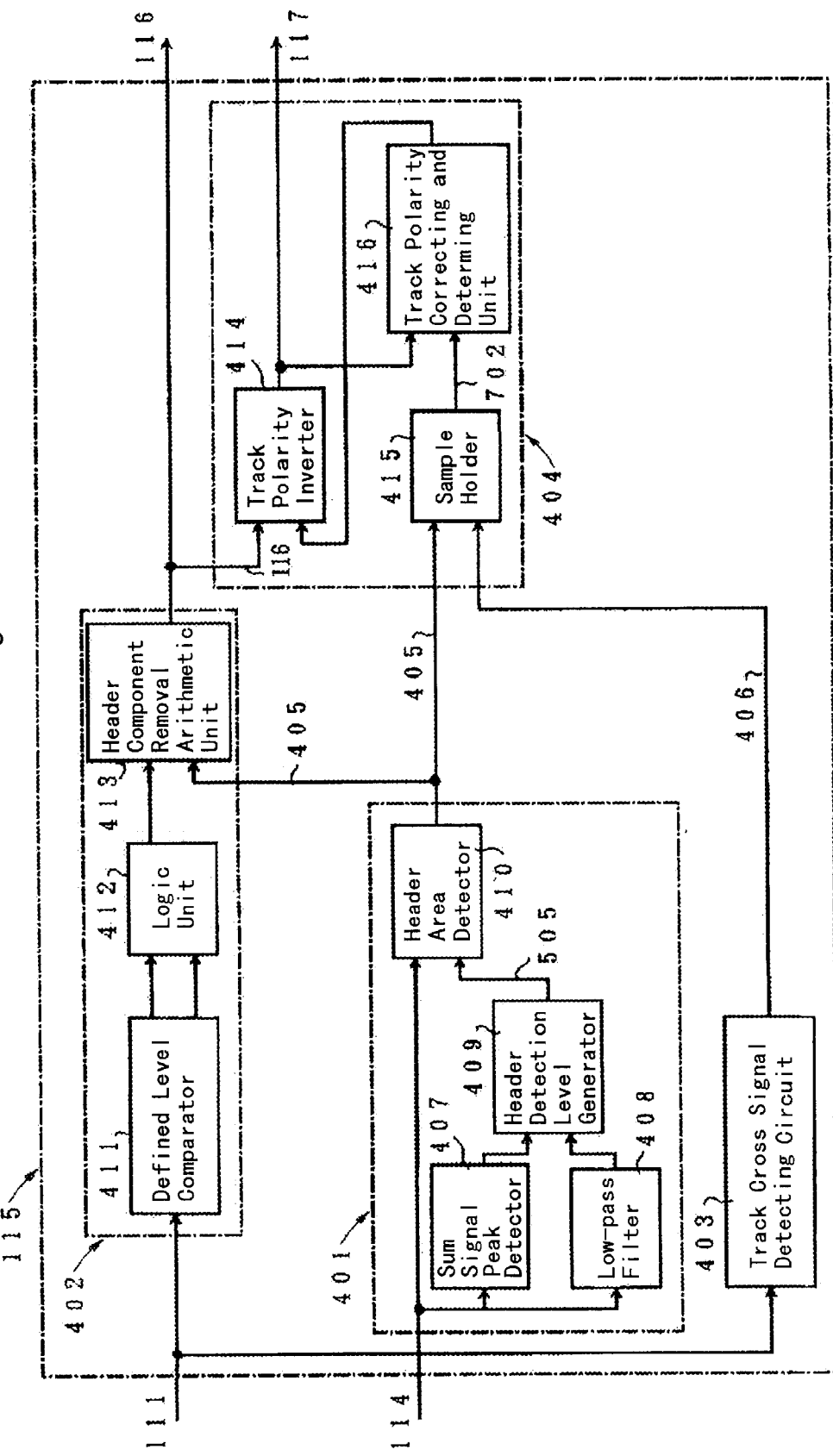
FIG. 5 is a block diagram showing one example of a land/groove detecting section in the optical disc apparatus of the present invention.

The following will specifically explain the above-mentioned land groove detecting section 115 with reference to FIG. 5. FIG. 5 is a block diagram showing the specific configuration of the land/groove detecting section 115. As shown in FIG. 5, the land/groove detecting section 115 comprises a header area detecting circuit 401, a track pull-in enabling signal detecting circuit 402, a track cross signal detecting circuit 403, and a land/groove determining and correcting circuit 404.

The header area detecting circuit 401 comprises a sum signal peak detector 407, a low-pass filter 408, a header detection level generator 409, and a header area detector 410.

The sum signal peak detector 407 detects a peak value of the track sum signal 114 sent from the track sum signal generating circuit 113. The sum signal peak detector 407 supplies the detected peak value to the header detection level generator 409.

The low-pass filter 408 extracts a low frequency component from the track sum signal 114 sent from the track sum signal generating circuit 113. The low-pass filter 408 supplies the extracted low frequency component to the header detection level generator 409.

The header detection level generator 409 generates a header detection level signal 505 in accordance with the peak value sent from the sum signal peak detector 407 and the low frequency component sent from the low-pass filter 408. The header detection level generator 409 supplies the generated header detection level signal 505 to the header area detector 410.

The header area detector 410 generates a header area signal 405 in accordance with the track sum signal 114 sent from the track sum signal generating circuit 113 and the header detection level signal 505 sent from the header detection level generator 409. The header area detector 410 supplies the generated header area signal 405 to the track pull-in enabling signal detecting circuit 402 and the land/groove determining and correcting circuit 404.

The track pull-in enabling signal detecting circuit 402 comprises a defined level comparator 411, a logic unit 412, and a header component removal arithmetic unit 413.

The defined level comparator 411 carries out a comparison between the track error signal 111 sent from the track error signal generating circuit 110 and a predetermined upper limit level and a comparison between the track error signal 111 and a predetermined lower limit level. The defined level comparator 411 supplies the respective detection signals, which are based on the comparison results, to the logic unit 412.

The logic unit 412 binarizes two detection signals sent from the defined level detector 411, and performs logical combination. The logic unit 412 supplies the logical combined output signal to the header component removal arithmetic unit 413.

The header component removal arithmetic unit 413 removes a variation of the signal in the header area from the output signal sent from the logic unit 412 in accordance with the header area signal 405 sent from the header area detector 410, thereby generating the track pull-in enabling signal 116. The header component removal arithmetic unit 413 supplies the generated track pull-in enabling signal 116 to the land/groove determining and correcting circuit 404, etc.

The track cross signal detecting circuit 403 generates a track cross signal 406 for detecting that the optical beams have crossed the track center (the center of the land or that of the groove) in accordance with the track error signal 111 sent from the track error signal generating circuit 110. The track cross signal detecting circuit 403 supplies the generated track cross signal to the land/groove determining and correcting circuit 404.

The land/groove determining and correcting circuit 404 comprises a track polarity inverter 414, a sample holder 415, and a track polarity correcting and determining unit 416.

The track polarity inverter 414 generates a land/groove detection signal for determining lands and grooves in accordance with the track pull-in enabling signal 116 sent from the header component removal arithmetic unit 413 and the output signal sent from the track polarity correcting and determining device unit 416. The track polarity inverter 414 supplies the generated land/groove detection signal 117 to the track polarity correcting and determining unit 416, etc.

The sample holder 415 holds the signal level of the track cross signal 406 sent from the track cross signal detecting circuit 403 in the header area in accordance with the header area signal 405 sent from the header area detector 410. The sample holder 415 supplies a polarity signal 702, which holds the signal level in the header area, to the track polarity correcting and determining unit 416.

The track polarity correcting and determining unit 416 compares a land/groove detection signal 117 sent from the track polarity inverter 414 with the polarity signal 702 sent from the sample holder 415. Then, the track polarity correcting and determining unit 416 corrects the signal level of the land/groove detection signal 117 when the land and groove polarities, which are shown by both signals, are different from each other. The track polarity correcting and determining unit 416 supplies the output signal, in which the signal level of the land/groove detection signal 117 is corrected, to the track polarity inverter 414.

The following will explain the specific operation of the above-configured land/groove detector 115 with reference to FIGS. 6 to 9B.

First, an operation of the header area detecting circuit 401 will be explained. FIG. 6 is a schematic view showing one example of a waveform to explain the operation of the header area detecting circuit 401. The track sum signal 114 shown in FIG. 6 is a sum of the amount of light received by four light-receiving sections of the optical sensor 104. In other words, the tack sum signal 114 is the total sum of light-reception signals reflected by the optical disc 100, and includes the data area where data is stored and a signal in the header area in which an address is stored. As mentioned above, the provision of the mirror portion with a high reflection coefficient in the header area increases the signal level of the track sum signal 114 in the header area as compared with the header area. Namely, in the track sum signal 114, the signal level in the header area shown by an ellipse 501 in FIG. 6 becomes greater than the signal level in the header area shown by an ellipse 502. The sum signal peak detector 407 detects a peak level 503 from the track sum signal 114. The low-pass filter 408 removes the high frequency component in the track sum signal 114 so as to obtain a sum signal base level 504. The header detection level generator 409 obtains the header detection level 505 in which the peak level 503 and the sum signal base level 504 are internally divided at a predetermined ratio. The header area detector 410 compares the track sum signal 114 with a header detection level 505, and binarizes the comparison result, thereby obtaining the header area signal 405.

Figure 7A:
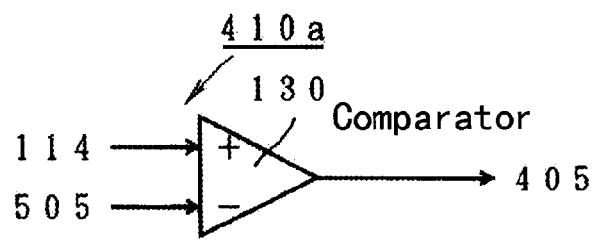
FIG. 7A is a circuit diagram sowing a first example of a header area detector in the optical disc apparatus of the present invention.
Figure 7B:
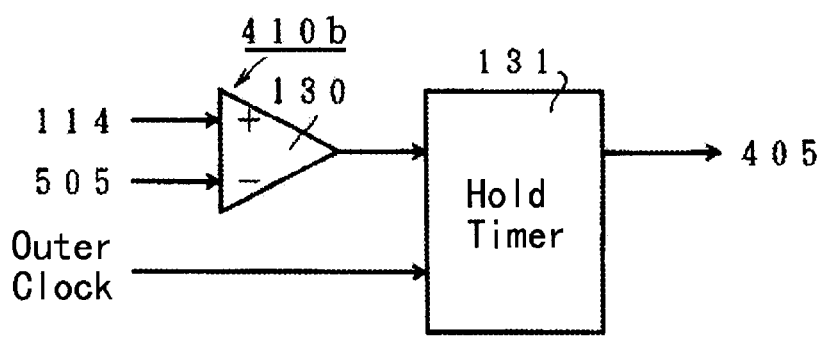
FIG. 7B is a circuit diagram sowing a second example of a header area detector in the optical disc apparatus of the present invention.
Figure 7C:
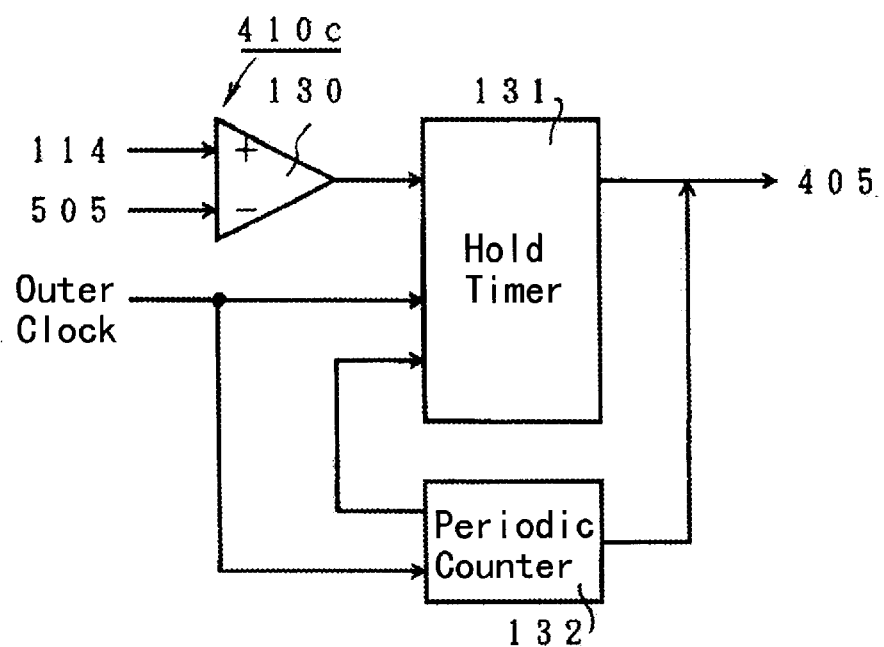
FIG. 7C is a circuit diagram sowing a third example of a header area detector in the optical disc apparatus of the present invention.

The header area detector 410, which performs the above-explained operation, comprises circuits as shown in, for example, FIGS. 7A to 7C.

A header area detector 410a shown in FIG. 7A has a single comparator 130. The header area detector 410a detects the header area by comparing the track sum signal 114 with the header detection level 505.

A header area detector 410b shown in FIG. 7B comprises a comparator 130 and a hold timer 131. The header area detector 410b holds a signal, which has been obtained by the comparator 130, for a fixed period time in accordance with an outer clock, etc., by use of the hold timer 131. As a result, even when the output of the comparator 130 in the header area can not be obtained, the entirety of the header area can be detected if only a header top portion can be detected.

A header area detector 410c shown in FIG. 7C comprises the comparator 130, the hold timer 131, and a periodic counter 132. The header area detector 410c can suitably change hold time of the hold timer 131 by use of the periodic counter 132. If the optical disc 100 always rotates at a constant rotational speed, there is no need to change hold time since time for which the optical beams pass through the header area is constant. Nevertheless, if the rotational speed of the optical disc 100 changes, time for which the optical beams pass through the header changes with the change in the rotational speed. For this reason, the header area detector 410c measures the periodicity between the header areas by the periodic counter 132, and changes hold time of the hold timer 131 in accordance with the measurement result. This makes it possible to obtain the correct header area signal 405.

Next, the operations of the track pull-in enabling signal detecting circuit 402 and the land/groove detecting circuit 404 will be explained. FIG. 8 is a schematic view showing one example of a signal waveform to explain the operations of the track pull-in enabling signal detecting circuit 402 and the land/groove detecting circuit 404.

As shown in FIG. 8, the track error signal 111 sent from the track error signal generating circuit 110 includes offsets 111a, 111b, 111c. The offsets 111a, 111b, 111c indicate the changes of the level signal, which corresponds to the offsets 204 and 205 explained with reference to FIG. 3B. Also, they show that the optical beams have moved from the data area (the area where the lands and grooves are arranged) to the header area. Namely, in a case where the optical beams move to the header area from the land, the signal level of the track error signal 111 varies in the positive direction with reference to a central level 701 (offsets 111a, 111c). While, in a case where the optical beams move to the header area from the groove, the signal level of the track error signal 111 varies in the negative direction with reference to the central level 701 (offsets 111b).

The defined level comparator 411 carries out a comparison between the track error signal 111 and a predetermined upper limit level 601 and a comparison between the track error signal 111 and a predetermined lower limit level 602. Then, the defined level comparator 411 binarizes each comparison result, thereby generating an upper limit comparison signal 603 and a lower limit comparison signal 604, respectively.

The logic unit 412 ANDs a invert signal in which the logic of the upper limit comparison signal 603 and the lower limit comparison signal 604, thereby obtaining a track pull-in enabling signal 605.

In this case, there is a case in which an unnecessary header component such as offset 111c is included in the obtained track pull-in enabling signal 605.

In this case, the header component removal arithmetic unit 413 removes the header component from the track pull-in enabling signal 605 by use of the header area signal 405 sent from the header area detecting circuit 401 explained with reference to FIG. 6. More specifically, the header component removal arithmetic unit 413 holds the signal level of the immediately preceding track pull-in enabling signal 605 in the header area shown by the header area signal 405, thereby removing the header component. As a result, the header component removal arithmetic unit 413 can obtain the track pull-in enabling signal 116 including no header component.

Figure 9A:
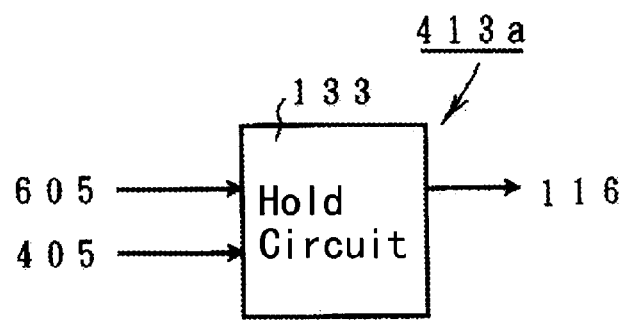
FIG. 9A is a circuit diagram showing a first example of a header component removal arithmetic unit in the optical disc apparatus of the present invention.
Figure 9B:
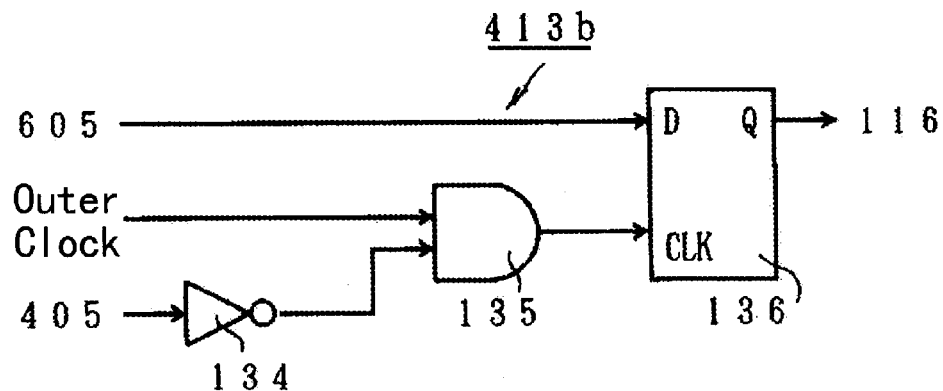
FIG. 9B is a circuit diagram showing a second example of a header component removal arithmetic unit in the optical disc apparatus of the present invention.

Such header component removal arithmetic unit 413 is formed of circuits shown by, for example, FIGS. 9A and 9B.

A header component removal arithmetic unit 413a shown in FIG. 9A is formed of a single hold circuit 133. The hold circuit 133 holds the signal level of the track pull-in enabling signal 605 while the header area signal 405 shows the header area, thereby removing the header component.

A header component removal arithmetic unit 413b shown in FIG. 9B is formed of an inverter 134, an AND gate 135, and a D flip-flop 136. In the header component removal arithmetic unit 413b, the inverter 134 inverts the header area signal 405, and the AND gate 135 ANDs the inverted signal and a predetermined outer clock. The header component removal arithmetic unit 413b inputs this AND signal as a clock of a D flip-flop 136 and the track pull-in enabling signal 605 as a clock of the D flip-flop 136. Namely, in the header component removal arithmetic unit 413b, the D flip-flop 136 latches data (signal level of the track pull-in enabling signal 605) every clock timing at which the clock is passed from the AND gate 135 in the non-header area (data area). While, in the header area, since the clock is stopped by the AND gate 135 and no clock is supplied to the D flip-flop 136, data, which is latched by the D flip-flop 136 just before entering the header area, is held. As a result, the header component removal arithmetic unit 413b can obtain the track pull-in enabling signal 116 from which the header component has been removed by the D flip-flop 136.

Back to the explanation of FIG. 8, the track pull-in enabling signal 116 sent from the header component removal arithmetic unit 413 becomes "1" (high level) when the track error signal 111 is present between the upper limit level 601 and the lower limit level 602. As mentioned above, the polarity of the level of the track error signal 111 changes every time when the optical beams move to the boundary portion between the land and groove. The track pull-in operation becomes unstable or is in a disable state with the change in the polarity. For this reason, in a case where the track error signal 111 is not present between the upper limit level 601 and the lower limit level 602, that is, in the boundary portion between the land and the groove (in the vicinity of upper and lower peaks of the track error signal 111), the track pull-in enabling signal 116 becomes "0" (low level). The track pull-in enabling signal detecting circuit 402 makes it impossible to carry out the track pull-in operation for the time period over which the track pull-in operation becomes unstable or is in a disable state with the change in the polarity. This makes it possible to detect the polarities of the land and groove from the state in which the level of the track pull-in enabling signal 116 becomes "0".

The track polarity inverter 414 outputs the land/groove detection signal 117 whose level polarity has been inverted at every timing when the level of the track pull-in enabling signal 116 is in a track pull-in enabling state (rise timing of the track pull-in enabling signal 116).

As mentioned above, the track error signal 111 includes offsets 111a, 111b, and 111c. The polarities of offsets 111a, 111b, 111c are inverted with reference to the center level 701. The track cross signal detecting circuit 403 outputs the track cross signal 406, which has been generated by binarizing the track error signal 111 with reference to the center level 701. The sample holder 415 outputs the polarity signal 702 in which the level of the track cross signal 406 has been sampled every header area shown by the header area signal 405. Then, it is possible to detect to which polarity of the land and the groove the header area belongs based on the polarity signal 702.

The track polarity correcting and determining unit 416 compares the polarity signal 702 held by the sample holder 415 with the land/groove detection signal 117 in the header area. If both signal levels are different from each other, the track polarity correcting and determining unit 416 corrects the level of the land/groove detection signal 117 to the polarity signal (signal level) held by the sample holder 415.

For example, as shown by an ellipse 703 in FIG. 8, in the head area of the offset 111a, the polarity signal 702 sent from the sample holder 415 was "1", while he polarity of the land/groove detection signal 117 was "0". In other words, since both polarities (signal levels) are different from each other, the track polarity correcting and determining unit 416 corrects the polarity of the land/groove detection signal 117 to "1" as shown by an arrow in the ellipse 703. On the other hand, as shown by an ellipse 704, in the header area of the offset 111b, the polarity signal 702 matches the land/groove signal 117 in the term of the polarity of "0". For this reason, the track polarity correcting and determining unit 416 does not perform the correction of the land/groove detection signal 117.

In a case where the header area of the optical disc 100 has the arrangement of headers H explained with reference to FIG. 4, the determination of the land/groove in the header can be carried out in the similar manner by any one of the methods set forth below.

More specifically, the first method is one that holds the track cross signal 406 in the first half of the header by use of the sample holder 415. The second method is one that holds the track signal 406 in the second half of the header by use of the sample holder 415. The third method is one that holds the track cross signal 406 in each of the first and second halves of the header by use of the sample holder 415 so as to perform a double determination. The fourth method is one that determines the land and groove based on a change in an edge of the track cross signal 406 in the header area.

A brief explanation will be given of a track pull-in operation in the optical disc apparatus. The CPU 124 monitors the track pull-in enabling signal 116 sent from the land groove detecting circuit 404 and the land/groove detection signal 117 at the time of executing a track pull-in command. The CPU 124 starts track control when the target land/groove polarity (polarity of the land or that of the groove) matches the signal level of the land/groove detection signal 117 and the track pull-in enabling signal 116 continues to be in a track pull-in enabling state (high level) for a fixed period of time. As a result, a stable track pull-in operation can be implemented.

Figure 10:
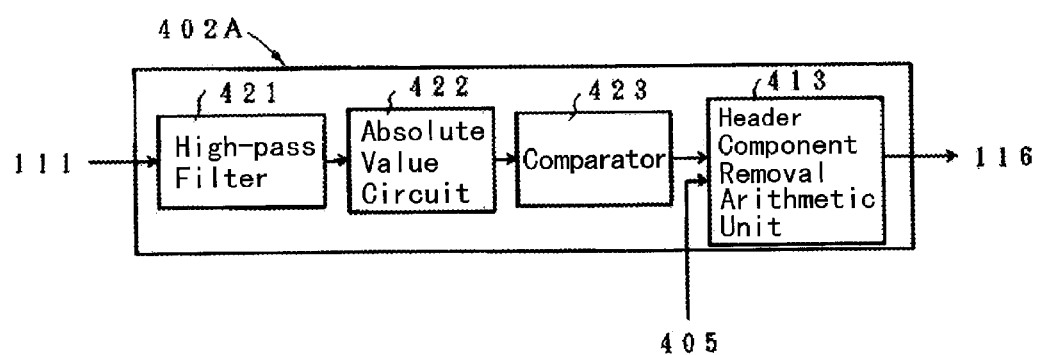
FIG. 10 is a block diagram showing a configuration of a track pull-in enabling detecting circuit according to a second embodiment of the present invention.

The optical disc apparatus according to a second embodiment of the present invention will be explained with reference to the drawings. FIG. 10 is a block diagram showing one example of a characteristic track pull-in enabling detecting circuit 402A. The other configuration is the same as that of the first embodiment.

A track pull-in enabling signal detecting circuit 402A comprises a high-pass filter 421, an absolute value circuit 422, a comparator 423, and the header component removal arithmetic unit 413.

The high-pass filter 421 removes a d.c. component from the track error signal 111.

The absolute value circuit 422 renders an output signal of the high-pass filter 421 non-coded. In other words, the absolute value circuit 422 generates an absolute value signal in which a negative signal level is inverted.

The comparator 423 determines that the signal level of the absolute value signal sent from the absolute value circuit 422 is less than a predetermined level.

The header component removal arithmetic unit 413, similar to the first embodiment, removes the variation of the signal in the header area from the output signal sent from the comparator 423 according to the header area signal 405, thereby generating the track pull-in enabling signal 116.

Next, an explanation will be given of an operation of the track pull-in enabling signal detecting circuit 402A. FIG. 11 is a schematic view showing one example of a signal waveform to explain the operation of the track pull-in enabling signal detecting circuit 402A.

The absolute value circuit 422 generates an absolute value signal 801 by rendering a signal, in which the d.c. component is removed from the track error signal 111 sent from the high-pass filter 421, non-coded.

The comparator 423 compares the signal level of the absolute value signal 801, which has been sent from the absolute value circuit 422, with a predetermined defined level 802 and binarizes the result, thereby generating the track pull-in enabling signal 605. There is a case in which the track pull-in enabling signal 605 includes an unnecessary header component, similar to the first embodiment. In this case, the header component removal arithmetic unit 413, which is identical with the first embodiment, removes the header component, thereby generating the track pull-in enabling signal 116. Unlike the track pull-in enabling signal detecting circuit 402 of the first embodiment, the track pull-in enabling signal detecting circuit 402A needs no logic unit 412 since the number of signal levels to be compared is one. As s result, it is possible to simplify the configuration of the track pull-in enabling signal detecting circuit 402A according to the second embodiment. The high-pass filter 421 may be omitted to further simplify the configuration of the track pull-in enabling signal detecting circuit 402A.

Figure 12A:
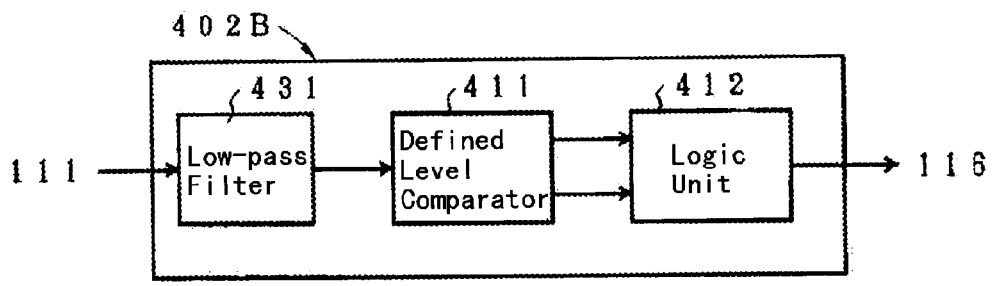
FIG. 12A is a block diagram showing a configuration of a track pull-in enabling detecting circuit according to a third embodiment of the present invention.

The optical disc apparatus according to a third embodiment of the present invention will be explained with reference to the drawings. FIG. 12A is a block diagram showing one example of a characteristic track pull-in enabling detecting circuit 402B. The other configuration is the same as that of the first embodiment.

The track pull-in enabling detecting circuit 402B comprises a low-pass filter 431, the defined level comparator 411, and the logic unit 412.

The low-pass filter 431 removes a high frequency component, that is, a header component, from the track error signal 111.

The defined level comparator 411, similar to the first embodiment, carries out a comparison between the track error signal 111 in which the header component is removed and a predetermined upper limit level and a comparison between the track error signal 111 and a predetermined lower limit level, respectively.

The logic unit 412, similar to the first embodiment, binarizes two detection signals sent from the defined level comparator 411, and performs a logical combination.

The track pull-in enabling detecting circuit 402B uses a signal, in which the header component is removed from the track error signal 111 by the low-pass filter, as an input, and compares it with the defined level by use of the defined level comparator 411, and binarizes the result, thereby generating the track pull-in enabling signal 116.

Unlike the track pull-in enabling signal detecting circuit 402 of the first embodiment, the track pull-in enabling signal detecting circuit 402B needs no header component removal arithmetic unit 413 since the header component is removed by the low-pass filter 431. As a result, it is possible to simplify the configuration of the track pull-in enabling signal detecting circuit 402B according to the third embodiment.

Figure 12B:
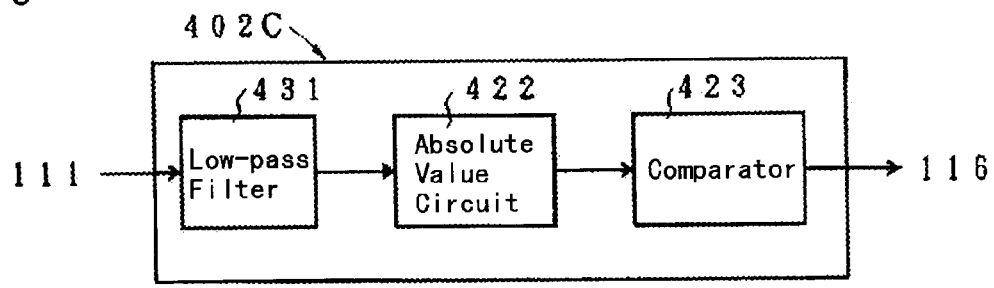
FIG. 12B is a block diagram showing the other configuration of the track pull-in enabling detecting circuit.

Also, as a modification of the third embodiment, a track pull-in enabling signal detecting circuit 402C is shown in FIG. 12B. The track pull-in enabling signal detecting circuit 402C shown in FIG. 12B comprises the absolute value circuit 422 and the comparator 423 in place of the defined level comparator 411 and the logic unit 412 shown in FIG. 12A. The absolute value circuit 422 and the comparator 423 are the same as those of the second embodiment.

Unlike the track pull-in enabling signal detecting circuit 402 of the first embodiment, the track pull-in enabling signal detecting circuit 402C does not need the header component removal arithmetic unit 413.

The optical disc apparatus according to a fourth embodiment of the present invention will be explained with reference to the drawings.

The optical disc apparatus according to the fourth embodiment comprises the track pull-in enabling signal detecting circuit 402 of the first embodiment and the land/groove determining and correcting circuit 404. Namely, only when the polarity of the track to be pulled in (land or groove) matches the signal level of the land/groove detection signal 117 and the track error signal 111 is in the defined level, the optical disc apparatus sets the signal level of the track pull-in enabling signal 116 to the high level (track pull-in enabling state) and outputs it. As a result, since only one signal may be monitored, an operation load can be reduced in a case where a digital processor, etc., is used as CPU 124.

Figure 13:
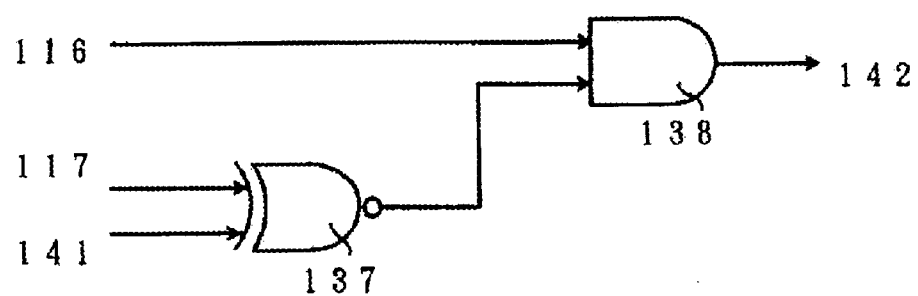
FIG. 13 is a circuit diagram showing one example of a circuit for generating a land or groove track pull-in signal.

For example, as shown in FIG. 13, the optical disc apparatus is configured such that a land/groove selection signal 141, which selects either one of the land and the groove, can be input from an outer unit. An XNOR gate 137 inputs the land/groove selection signal 141 and the land/groove detection signal 117 sent from the land/groove determining and correcting circuit 404. An AND gate 138 inputs an output of XNOR gate 137 and the track pull-in enabling signal 116, and ANDs them, thereby outputting a land/groove pull-in signal 142. The land/groove pull-in signal 142 is one, which shows that the track (land or groove) selected by the land/groove selection signal 141 can be pulled in.

Figure 14:
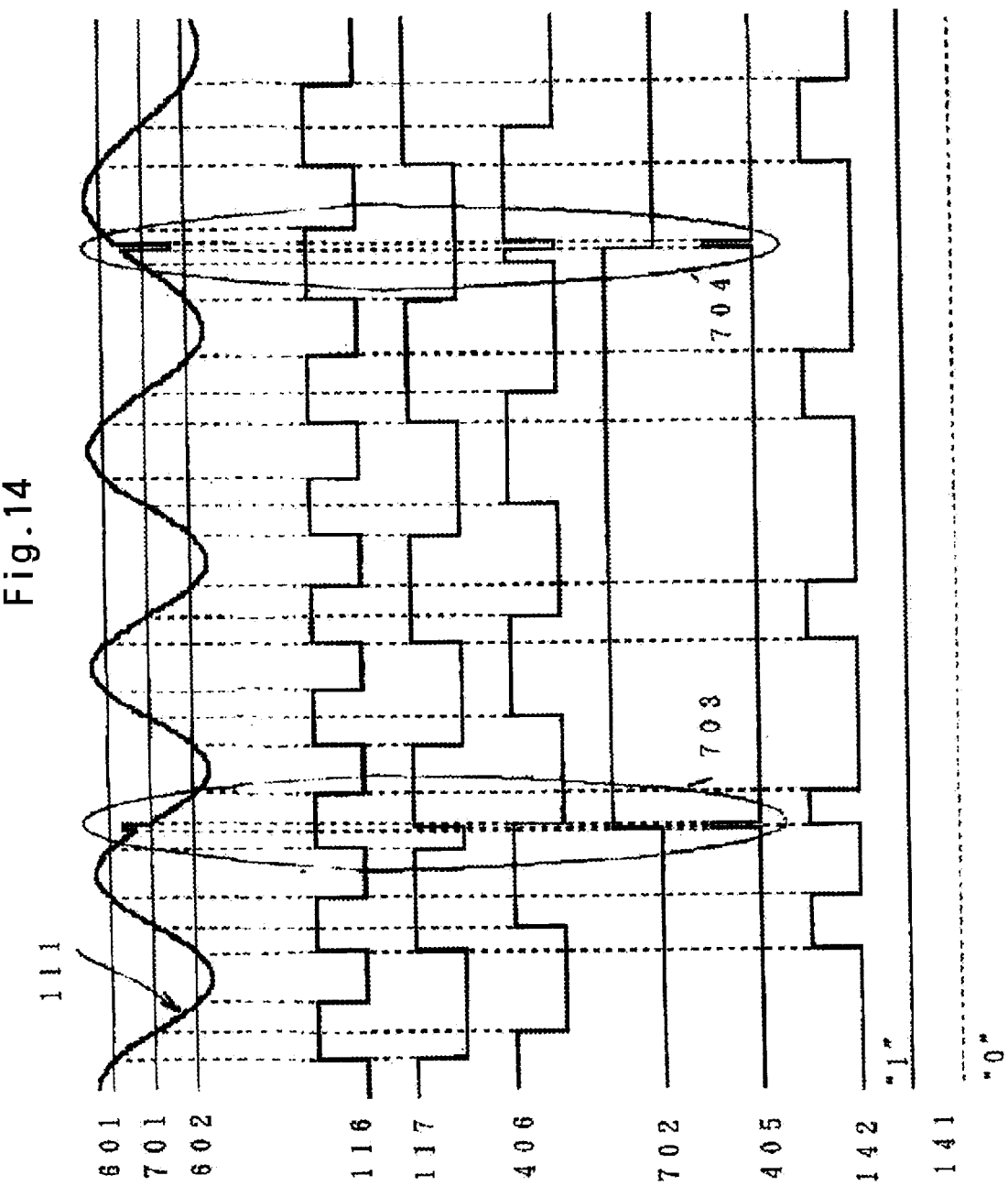
FIG. 14 is a signal waveform view to explain a state in which the land is selected by the circuit of FIG. 13.
Figure 15:
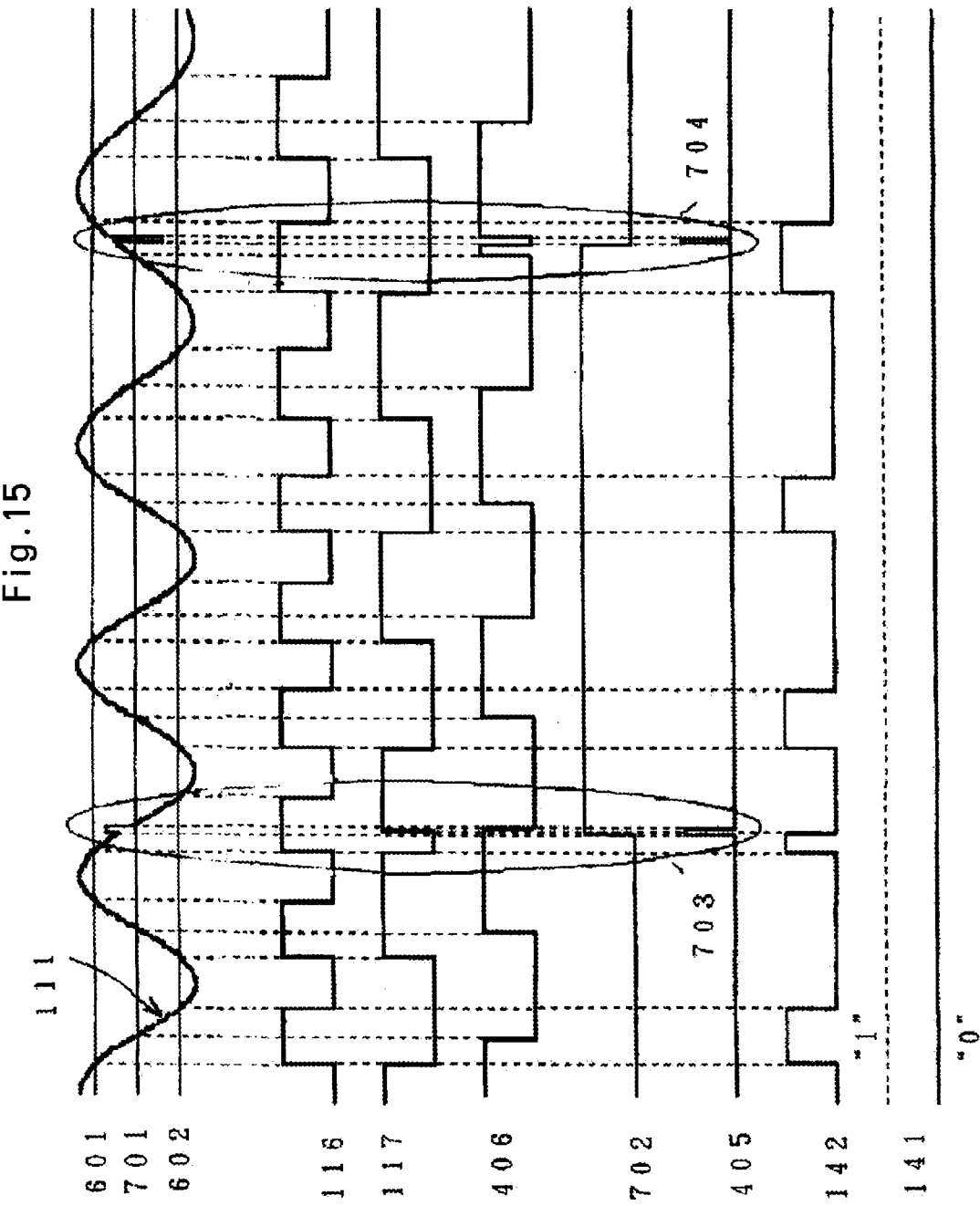
FIG. 15 is a signal waveform view to explain a state in which the groove is selected by the circuit of FIG. 13.
Figure 16:
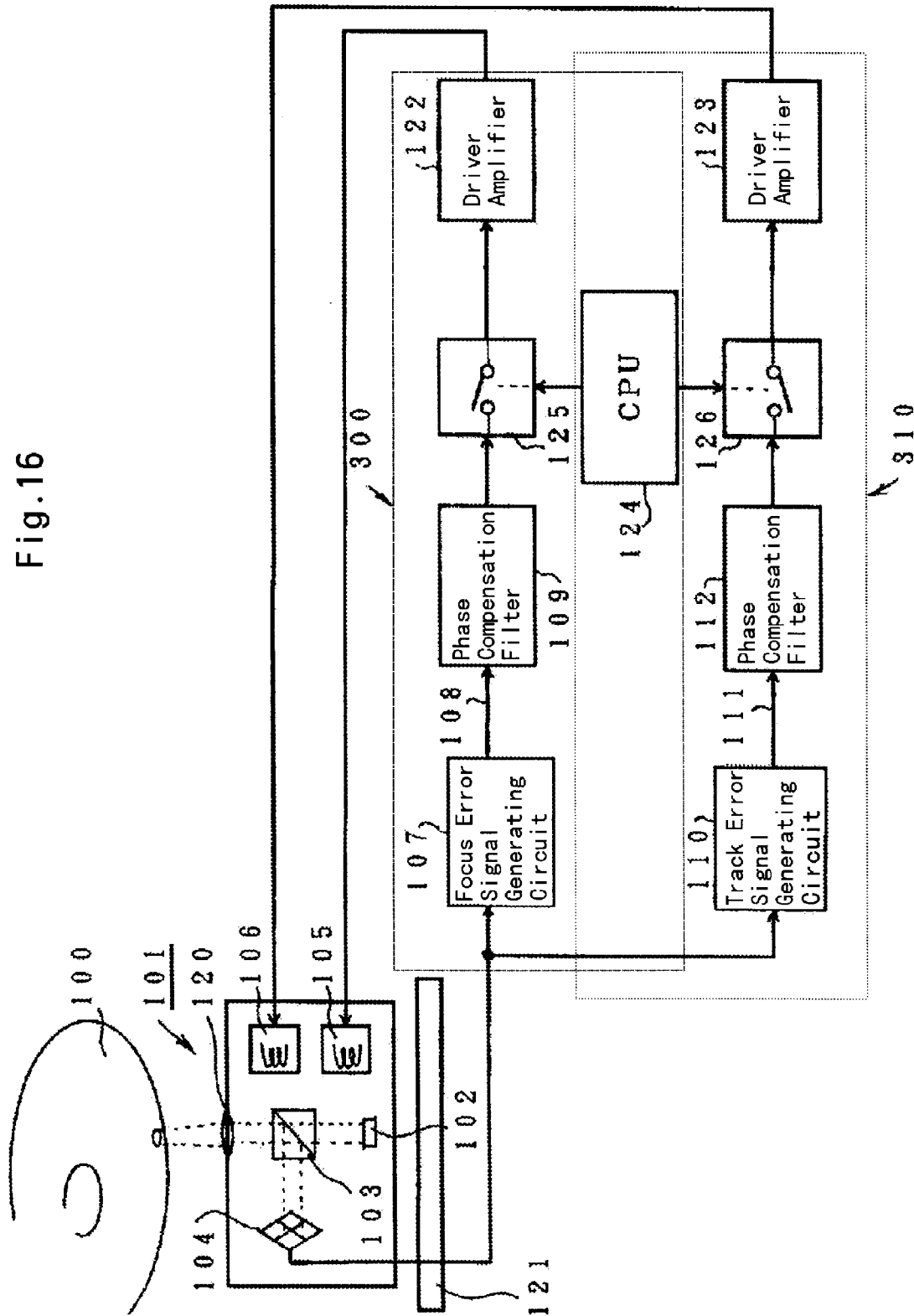
FIG. 16 is a block diagram showing one example of a conventional optical disc apparatus.

FIG. 14 is a schematic view showing one example of a waveform to explain an operation performed when the land is selected by the land/groove selection signal 141 (the signal level of the land/groove selection signal 141 is "1"). As shown in FIG. 14, the signal level of the land/groove selection signal 142 becomes "1" (high level) only when the land can be pulled in. While, FIG. 15 is a schematic view showing one example of a waveform to explain an operation performed when the groove is selected by the land/groove selection signal 141 (the signal level of the land/groove selection signal 141 is "0"). As shown in FIG. 15, the signal level of the land/groove selection signal 142 becomes "1" (high level) only when the groove can be pulled in. Therefore, the optical disc apparatus according to the fourth embodiment can be applied to the case of controlling each tracking in the conventional optical disk of the land recording system or that of the groove recording system.

In the above embodiment, the mirror section, etc., which is provided in the header area of the optical disc 100 is detected, thereby generating the header area signal 405. However, a predetermined fixed pattern for detecting the header area is detected, thereby the header area signal 405 may be generated. For example, the fixed pattern is located at the head of the header area in the optical disc or just before the header area, and the fixed pattern located is detected by the fixed pattern detector, thereby generating the header area signal 405.

As explained above, according to the optical disc apparatus of the present invention, the following effects can be obtained. More specifically, the first effect is that the track pull-in operation is stable in the optical disc apparatus of the land/groove recording/reproducing system. The reason is that the polarity of the land/groove can be determined by the land/groove detecting circuit even in an off-track state, and that the track pull-in operation of a target polarity can be always performed. The second effect is that processing time required for track pull-in operation at a track pull-in time and a seek operation time can be shortened. The reason is that the polarity of the land or groove in the track can be detected so that an excessive response (amount of control) at the track pull-in time can be lessened. Then, the track pull-in operation can be correctly carried out without the track pull-in of opposite polarity, and track pull-in determining time and time required for re-pulling-in operation can be reduced.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. H10-360342 filed on Dec. 18, 1998 and including specification, claims, drawings and summary. The disclosure of the above Japanese Patent Application is incorporated herein by reference in its entirety.

What is claimed is:

1. An optical disc apparatus comprising:
   optical beam irradiating means for irradiating a track, which has lands and grooves formed on an optical disc, with optical beams;
   light-receiving means for receiving reflected light of the optical beams irradiated by said optical beam irradiating means;
   track error signal generating means for generating a track error signal, which shows a shift from the track in the optical beam irradiated by said optical beam irradiating means, in accordance with an amount of the reflected light received by said light receiving means;
   track sum signal generating means for generating a track sum signal, which shows a total amount of the reflected light, in accordance with the amount of said reflected light received by said light receiving means;
   land/groove detecting means for generating a track pull-in enabling signal, which shows track pull-in enabling timing, and a land/groove detection signal for determining a land or a groove in accordance with the track error signal generated by said track error signal generating means and the track sum signal generated by said track sum signal generating means; and
   track pull-in means for performing a track pull-in in accordance with the track pull-in enabling signal generated by said land/groove detecting means and the land/groove detection signal.

2. The optical disc according to claim 1, wherein said land/groove detecting means comprises:

header area signal generating means for generating a header area signal, which shows a header area in the optical disc, in accordance with the track sum signal generated by said track sum signal generating means;

track pull-in enabling signal generating means for generating the track pull-in enabling signal in accordance with the track error signal generated by said track error signal generating means and the header area signal generated by said header area signal generating means;

track cross signal generating means for generating a track cross signal, which shows that the optical beams irradiated by said optical beam irradiating means have crossed the center of the track; and land/groove detection signal generating means for generating a land/groove detection signal in accordance with the track pull-in enabling signal generated by said track pull-in enabling signal generating means, the header area signal generated by said header area signal generating means, and the track cross signal generated by said track cross signal generating means.

3. The optical disc apparatus according to claim 2, wherein said header area signal generating means comprises:

a peak detector for detecting a peak value from the track sum signal generated by said track sum signal generating means;

a low-pass filter for extracting a low frequency component from the track sum signal generated by said track sum signal generating means;

a header detection level generator for generating a header detection level in accordance with the peak value detected by said peak detector and the low frequency component extracted by said low-pass filter; and a header area detector for comparing the track sum signal generated by said track sum signal generating means with the header detection level generated by said header detection level generator so as to generate the header area signal.

4. The optical disc apparatus according to claim 2, wherein said track pull-in enabling signal generating means comprises:

a level comparator for comparing the track error signal generated by said track error signal generating means with each of a predetermined upper limit level and a predetermined lower limit level so as to generate two comparison signals showing the comparison results;

a logic unit for ANDing two comparison signals generated by said level comparator; and a header component removal arithmetic unit for outputting the track pull-in enabling signal from which the header component is removed from the result of said logic unit in accordance with the header area signal generated by said header area signal generating means.

5. The optical disc apparatus according to claim 2, wherein said track pull-in enabling signal detecting means comprises:

an absolute value signal generator for generating an absolute value signal in which a negative level is inverted from the track error signal generated by said track error signal generating means;

a defined level comparator for comparing the absolute value signal generated by said absolute value signal generator with a predetermined defined level so as to generate a comparison signal showing the comparison result; and a header component removal arithmetic unit for outputting the track pull-in enabling signal from which the header component is removed from the comparison signal generated by said defined level comparator in accordance with the header area signal generated by said header area signal generating means.

6. The optical disc apparatus according to claim 2, wherein said track pull-in enabling signal detecting means comprises:

a low-pass filter for extracting a low frequency component from the track error signal generated by said track error signal generating means;

a level comparator for comparing the low frequency component extracted by said low-pass filter with each of a predetermined upper limit level and a predetermined lower limit level so as to generate two comparison signals showing the comparison results; and a logic unit for ANDing two comparison signals generated by said level comparator.

7. The optical disc apparatus according to claim 2, wherein said track pull-in enabling signal detecting means comprises:

a low-pass filter for extracting a low frequency component from the track error signal generated by said track error signal generating means;

an absolute value signal generator for generating an absolute value signal in which a negative level is inverted from the low frequency component extracted by said low-pass filter; and a defined level comparator for comparing the absolute value signal generated by said absolute value signal generator with a predetermined defined level so as to generate a comparison signal showing the comparison result.

8. The optical disc apparatus according to claim 2, wherein said land/groove detection signal generating means comprises:

a track polarity inverter for generating a land/groove detection signal in which a signal level in the land and groove is inverted in accordance with the track pull-in enabling signal generated by said track pull-in enabling signal generating means;

a sample holder for holding a signal level of the track cross signal generated by said track cross signal generating means in accordance with the header area signal generated by said header area signal generating means; and a track polarity corrector for inverting the signal level of the land/groove detection signal generated by said track polarity inverter when the land/groove detection signal generated by said track polarity inverter is compared with the track cross signal held by said sample holder and no match exists in both signals.

9. The optical disc apparatus according to claim 1, wherein said land/groove detection signal generating means further comprises means for inputting a land/groove selection signal, which selects either one of the land and the groove, and for outputting a signal enabling a target track pull-in to be performed in accordance with the input land/groove selection signal.

10. An optical disc apparatus comprising:

a laser irradiator for irradiating a track, which has lands and grooves formed on an optical disc, with optical beams;

an optical sensor for receiving reflected light of the optical beams irradiated by said laser irradiator;

a track error signal generating circuit for generating a track error signal, which shows a shift from the track in the optical beam irradiated by said laser irradiator, in accordance with an amount of the reflected light received by said optical sensor;

a track sum signal generating circuit for generating a track sum signal, which shows a total amount of the reflected light, in accordance with the amount of the reflected light received by said optical sensor;

a land/groove detecting circuit for generating a track pull-in enabling signal, which shows track pull-in enabling timing, and a land/groove detection signal for determining a land or a groove in accordance with the track error signal generated by said track error signal generating circuit and the track sum signal generated by said track sum signal generating circuit; and a track actuator for performing track pull-in in accordance with the track pull-in enabling signal generated by said land/groove detecting circuit and the land/groove detection signal.

11. A land/groove detecting circuit comprising:

header area signal generating means for generating a header area signal, which shows a header area in an optical disc, in accordance with a track sum signal, which shows the total amount of reflected light of optical beams with which a track, which has lands and grooves formed on the optical disc, is irradiated;

track pull-in enabling signal generating means for generating a track pull-in enabling signal, which shows track pull-in enabling timing, in accordance with a track error signal, which shows a shift from the track in the optical beams with which the optical disc is irradiated, a header area signal generated by said header area signal generating means;

track cross signal generating means for generating a track cross signal, which shows that the optical beams with which the optical disc is irradiated have crossed the center of the track; and land/groove detection signal generating means for generating a land/groove detection signal for determining a land or a groove in accordance with the track pull-in enabling signal generated by said track pull-in enabling signal generating means, the header area signal generated by said header area signal generating means, and the track cross signal generated by said track cross signal generating means.

12. The land/groove detecting circuit according to claim 11, wherein said header area signal generating means comprises:

a peak detector for detecting a peak value from the track sum signal, which shows the total amount of reflected light of the optical beams with which the optical disk is irradiated;

a low-pass filter for extracting a low frequency component from the track sum signal, which shows the total amount of reflected light of the optical beams with which the optical disk is irradiated;

a header detection level generator for generating a header detection level in accordance with the peak value detected by said peak detector and the low frequency component extracted by said low-pass filter; and a header area detector for comparing the track sum signal, which shows the total amount of reflected light of the optical beams with which the optical disk is irradiated, with the header detection level generated by said header detection level generator so as to generate the header area signal.

13. The land/groove detecting circuit according to claim 11, wherein said track pull-in enabling signal generating means comprises:

a level comparator for comparing the track error signal, which shows a shift from the track in the optical beams with which the optical disc is irradiated, with each of a predetermined upper limit level and a predetermined lower limit level so as to generate two comparison signals showing the comparison results;

a logic unit for ANDing two comparison signals generated by said level comparator; and a header component removal arithmetic unit for outputting the track pull-in enabling signal from which the header component is removed from the result of said logic unit in accordance with the header area signal generated by said header area signal generating means.

14. The land/groove detecting circuit according to claim 11, wherein said track pull-in enabling signal detecting means comprises:

an absolute value signal generator for generating an absolute value signal in which a negative level is inverted from the track error signal generated by said track error signal, which shows a shift from the track in the optical beams with which the optical disc is irradiated;

a defined level comparator for comparing the absolute value signal generated by said absolute value signal generator with a predetermined defined level so as to generate a comparison signal showing the comparison result; and a header component removal arithmetic unit for outputting the track pull-in enabling signal from which the header component is removed from the comparison signal generated by said defined level comparator in accordance with the header area signal generated by said header area signal generating means.

15. The land/groove detecting circuit according to claim 11, wherein said track pull-in enabling detecting means comprises:

a low-pass filter for extracting a low frequency component from the track error signal, which shows a shift from the track in the optical beams with which the optical disc is irradiated;

a level comparator for comparing the low frequency component extracted by said low-pass filter with each of a predetermined upper limit level and a predetermined lower limit level so as to generate two comparison signals showing the comparison results; and a logic unit for ANDing two comparison signals generated by said level comparator.

16. The land/groove detecting circuit according to claim 11, wherein said track pull-in enabling signal detecting means comprises:

a low-pass filter for extracting a low frequency component from the track error signal, which shows a shift from the track in the optical beams with which the optical disc is irradiated;

an absolute value signal generator for generating an absolute value signal in which a negative level is inverted from the low frequency component extracted by said low-pass filter; and a defined level comparator for comparing the absolute value signal generated by said absolute value signal generator with a predetermined defined level so as to generate a comparison signal showing the comparison result.

17. The land/groove detecting circuit according to claim 11, wherein said land/groove detection signal generating means comprises:

a track polarity inverter for generating a land/groove detection signal in which a signal level in the land and groove is inverted in accordance with the track pull-in enabling signal generated by said track pull-in enabling signal generating means;

a sample holder for holding a signal level of the track cross signal generated by said track cross signal generating means in accordance with the header area signal generated by said header area signal generating means; and a track polarity corrector for inverting the signal level of the land/groove detection signal generated by said track polarity inverter when the land/groove detection signal generated by said track polarity inverter is compared with the track cross signal held by said sample holder and no match exists in both signals.

18. The land/groove detecting circuit according to claim 11, further comprises means for inputting a land/groove selection signal, which selects either one of the land and the groove, and for outputting a signal enabling a target track pull-in to be performed in accordance with the input land/groove selection signal.

19. A land/groove detecting circuit comprising:

a header area signal generating circuit for generating a header area signal, which shows a header area in an optical disc, in accordance with a track sum signal, which shows a total amount of reflected light of optical beams with which a track, which has lands and grooves formed on the optical disc, is irradiated;

a track pull-in enabling signal generating circuit for generating a track pull-in enabling signal, which shows track pull-in enabling timing, in accordance with a track error signal, which shows a shift from the track in the optical beams with which the optical disc is irradiated, a header area signal generated by said header area signal generating circuit;

a track cross signal generating circuit for generating a track cross signal, which shows that the optical beams with which the optical disc is irradiated have crossed the center of the track; and a land/groove detection signal generating circuit for generating a land/groove detection signal for determining a land or a groove in accordance with the track pull-in enabling signal generated by said track pull-in enabling signal generating circuit, the header area signal generated by said header area signal generating circuit, and the track cross signal generated by said track cross signal generating circuit.

* * * * *